United States Patent

Goto

(10) Patent No.: US 11,860,347 B2
(45) Date of Patent: Jan. 2, 2024

(54) ZOOM LENS AND IMAGE PICKUP APPARATUS

(71) Applicant: CANON KABUSHIKI KAISHA, Tokyo (JP)

(72) Inventor: Kazufumi Goto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 495 days.

(21) Appl. No.: 17/082,788

(22) Filed: Oct. 28, 2020

(65) Prior Publication Data

US 2021/0132347 A1 May 6, 2021

(30) Foreign Application Priority Data

Oct. 31, 2019 (JP) .................................. 2019-199107

(51) Int. Cl.
*G02B 15/20* (2006.01)
*G02B 27/00* (2006.01)

(52) U.S. Cl.
CPC ......... *G02B 15/20* (2013.01); *G02B 27/0025* (2013.01)

(58) Field of Classification Search
CPC ............... G02B 15/08; G02B 15/145125; G02B 15/20; G02B 27/0025
See application file for complete search history.

(56) References Cited

U.S. PATENT DOCUMENTS

| | | | | |
|---|---|---|---|---|
| 6,307,683 | B1 * | 10/2001 | Miyano | G02B 15/144113 359/686 |
| 2012/0019924 | A1 * | 1/2012 | Shimomura | G02B 15/1431 359/672 |
| 2014/0118607 | A1 | 5/2014 | Takemoto | |
| 2014/0362450 | A1 | 12/2014 | Shimomura | |
| 2016/0028971 | A1 | 1/2016 | Iriyama | |
| 2016/0124199 | A1 | 5/2016 | Sanjo | |
| 2017/0090164 | A1 | 3/2017 | Yamada | |

FOREIGN PATENT DOCUMENTS

| | | |
|---|---|---|
| JP | 2010-186179 A | 8/2010 |
| JP | 2013-238827 A | 11/2013 |
| JP | 2014-232273 A | 12/2014 |
| JP | 2016-045310 A | 4/2016 |
| JP | 2016-090591 A | 5/2016 |
| JP | 2016-224180 A | 12/2016 |
| JP | 2017-181577 A | 10/2017 |
| JP | 2019-120746 A | 7/2019 |
| JP | 2019-120772 A | 7/2019 |
| JP | 2019-124818 A | 7/2019 |

* cited by examiner

*Primary Examiner* — Joseph P Martinez
*Assistant Examiner* — Vipin Patel
(74) *Attorney, Agent, or Firm* — CANON U.S.A., INC. IP Division

(57) ABSTRACT

A zoom lens includes, in order from an object side to an image side, a first lens unit configured not to move for zooming, a plurality of zooming lens units configured to move in zooming, a front relay lens unit configured not to move for zooming, an extender lens unit insertable into and removable from an optical path for changing a focal length range of the zoom lens, and a rear relay lens unit configured not to move for zooming, and satisfies specific conditional expressions.

14 Claims, 19 Drawing Sheets

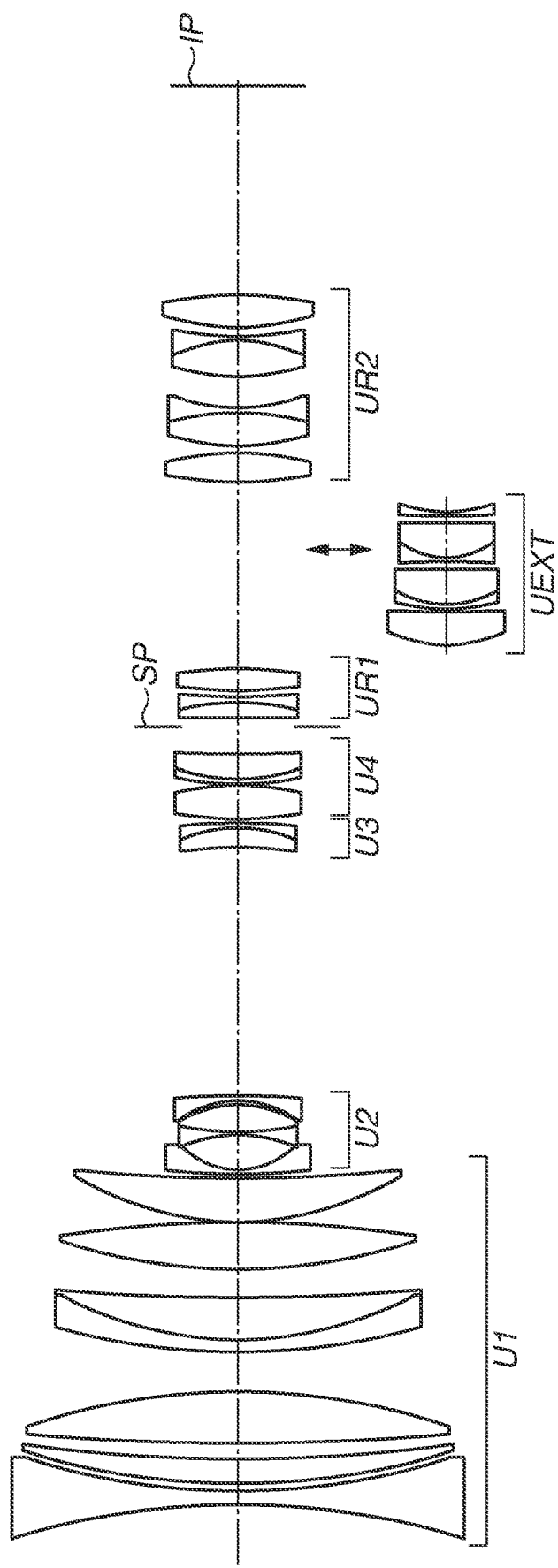

ZOOM LENS AND IMAGE PICKUP APPARATUS

BACKGROUND OF THE INVENTION

Field of the Invention

The aspect of the embodiments relates to a zoom lens and an image pickup apparatus.

Description of the Related Art

For performing image capturing for a television program or a film (for example, outdoor image capturing of an animal or a human from a long distance), there is demand for a zoom lens having a high zooming ratio and high optical performance. Because such image capturing is often performed in a state where a camera is held on a shoulder, there is demand for a zoom lens beneficial also from the aspects of downsizing, weight saving, and portability.

A teleconverter is used for changing a focal length range to a longer focal length range. Some zoom lenses for television cameras incorporate an extender (extender lens unit) insertable and removable into and from an afocal optical path in a relay lens unit. In the zoom lenses, even when a focal length range is switched by the insertion or removal of the extender, a total lens length and a back focus do not change.

In the field of image capturing for films, a camera equipped with a large-sized image pickup element that is beneficial for image capturing under the environment with low illuminance can be used. Thus, there is an increasing demand for a zoom lens with a high zooming ratio that is excellent in portability and mobility while having an image circle corresponding to the large-sized image pickup element.

Japanese Patent Laid-Open No. 2016-45310 discusses a zoom lens incorporating an extender that is beneficial from the aspects of a large image circle, a high zooming ratio, downsizing, and weight saving.

If a large-sized image pickup element is employed by the insertion of the incorporated extender into an optical path as in Japanese Patent Laid-Open No. 2016-45310, effective diameters of lenses in a relay lens unit and the extender that are arranged on an image side of a zooming lens unit increase. It can therefore become difficult to downsize the zoom lens.

SUMMARY OF THE INVENTION

According to one aspect of the embodiments, there is provided a zoom lens comprising in order from an object side to an image side: a first lens unit configured not to move for zooming; a plurality of zooming lens units configured to move in zooming; a front relay lens unit configured not to move for zooming; an extender lens unit insertable into and removable from an optical path for changing a focal length range of the zoom lens; and a rear relay lens unit configured not to move for zooming, wherein following conditional expressions are satisfied: $0.50<(Def/Der)/\beta e+(1-few/feF)<1.75$, and $0.50<(le/Der)/\beta e<1.22$, where few is a focal length at a wide-angle end and in a state where the extender lens unit is inserted, feF is a combined focal length from the first lens unit to the front relay lens unit, Def is an effective diameter of a lens included in the extender lens unit and closest to the object side, Der is an effective diameter of a lens included in the extender lens unit and closest to the image side, $\beta e$ is a lateral magnification of the extender lens unit, and le is a distance on an optical axis from a surface included in the extender lens unit and closest to the object side to a surface included in the extender lens unit and closest to the image side.

Further features of the disclosure will become apparent from the following description of exemplary embodiments with reference to the attached drawings.

BRIEF DESCRIPTION OF THE DRAWINGS

FIG. 1 is a cross-sectional diagram illustrating a zoom lens according to a first exemplary embodiment that is set at a wide-angle end and in a state where a focus is placed on an object at infinity.

DESCRIPTION OF THE EMBODIMENTS

Figure 2A:
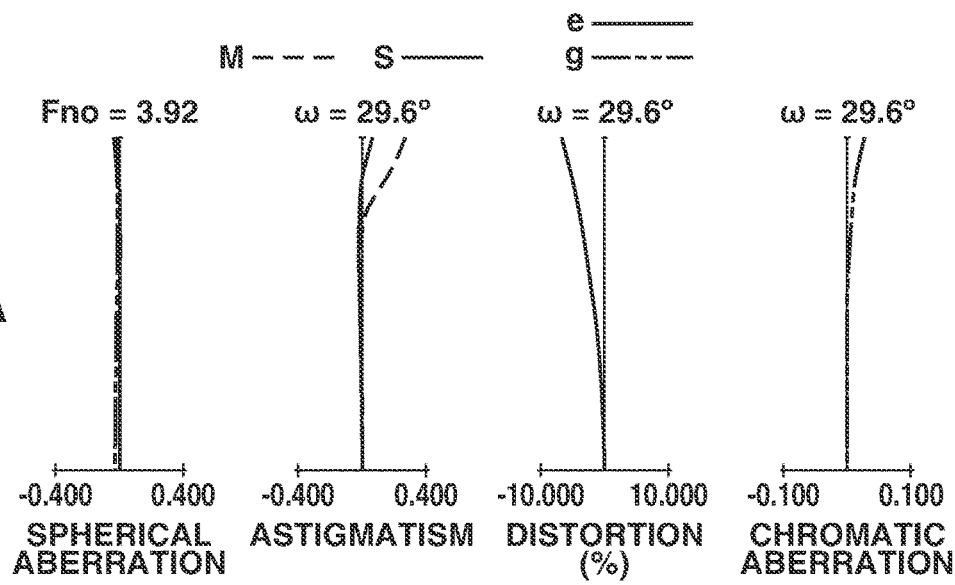
FIGS. 2A to 2F are aberration diagrams of the zoom lens according to the first exemplary embodiment.

Hereinafter, exemplary embodiments of the disclosure will be described with reference to the attached drawings. In all the drawings for describing the exemplary embodiments, as a general rule (unless otherwise stated), the same members are assigned the same reference numerals, and the redundant descriptions thereof will be omitted.

First Exemplary Embodiment

FIG. 1 is a cross-sectional diagram illustrating a zoom lens according to the first exemplary embodiment that is set at a wide-angle end and in a state where a focus is placed on an object at infinity and an extender lens unit is removed. The zoom lens illustrated in FIG. 1 includes a first lens unit U1 that has positive refractive power and does not move for zooming. A partial lens unit of the first lens unit U1 can move for focusing along an optical axis. The zoom lens further includes a second lens unit U2 (first variator) having negative refractive power. The second lens unit U2 moves (monotonously, for example) toward an image side along an optical axis for zooming from a wide-angle end (short focal length end) to a telephoto end (long focal length end). The zoom lens further includes a third lens unit U3 (second variator) having negative refractive power. The third lens unit U3 moves (non-monotonously, for example) along the optical axis for the zooming. The zoom lens further includes a fourth lens unit U4 (compensator) having positive refractive power. The fourth lens unit U4 moves (non-monotonously, for example) along the optical axis for the zooming (correction (compensation) of a variation in an image plane position that is attributed to the zooming). The zoom lens further includes an aperture stop SP. The zoom lens further includes a lens unit UR1 (front relay lens unit; R1 lens unit) that does not move for zooming. The zoom lens further includes a lens unit UR2 (rear relay lens unit; R2 lens unit) that does not move for zooming. An image plane IP corresponds to a plane on which a light receiving surface of an image pickup element (photoelectric conversion element) that receives light of an image formed by the zoom lens is arranged. The zoom lens further includes an extender lens unit UEXT (EXT lens unit) to be inserted or removed into or from an optical path between the R1 lens unit and the R2 lens unit (typically, an optical path of afocal light) for changing a focal length range of the zoom lens.

The configuration of each lens unit will now be described. Hereinafter, in each lens unit, lenses are arranged in order from an object side to an image side. The first lens unit U1 includes first to 13th surfaces, and consists of a negative lens, a positive lens, a positive lens, a cemented lens of a negative lens and a positive lens, a positive lens, and a positive lens (seven lenses). The second lens unit U2 includes 14th to 20th surfaces, and consists of a negative lens, a cemented lens of a negative lens and a positive lens, and a negative lens (four lenses). The third lens unit U3 includes 21st to 23rd surfaces, and consists of a cemented lens of a positive lens and a negative lens (two lenses). The fourth lens unit U4 includes 24th to 28th surfaces, and consists of a positive lens, and a cemented lens of a negative lens and a positive lens (three lenses). The lens unit UR1 includes 30th to 34th surfaces, and consists of a cemented lens of a positive lens and a negative lens, and a positive lens (three lenses). The lens unit UR2 includes 35th to 44th surfaces, and consists of a positive lens, a cemented lens of a positive lens and a negative lens, a cemented lens of a positive lens and a negative lens, and a positive lens (six lenses). The extender lens unit UEXT is insertable and removable into and from an optical path between the 34th and 35th surfaces, and consists of a positive lens, a cemented lens of a negative lens and a positive lens, a cemented lens of a negative lens and a positive lens, and a negative lens (six lenses).

Figure 2B:
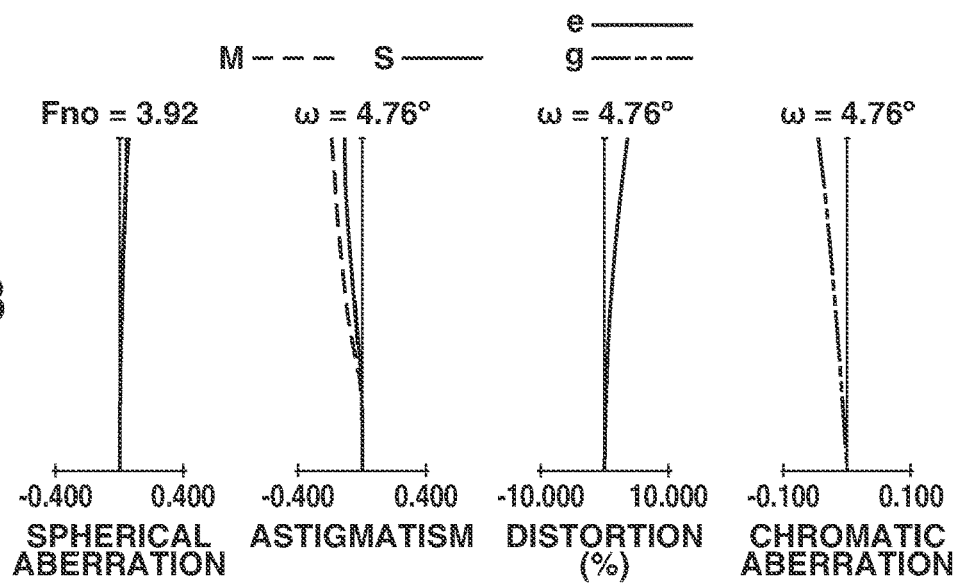
Figure 2C:
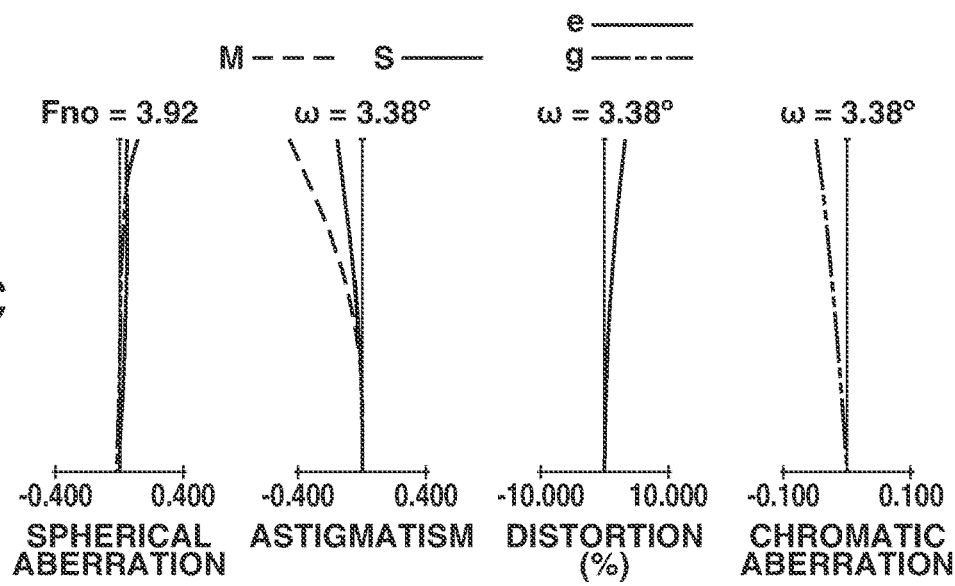
Figure 2D:
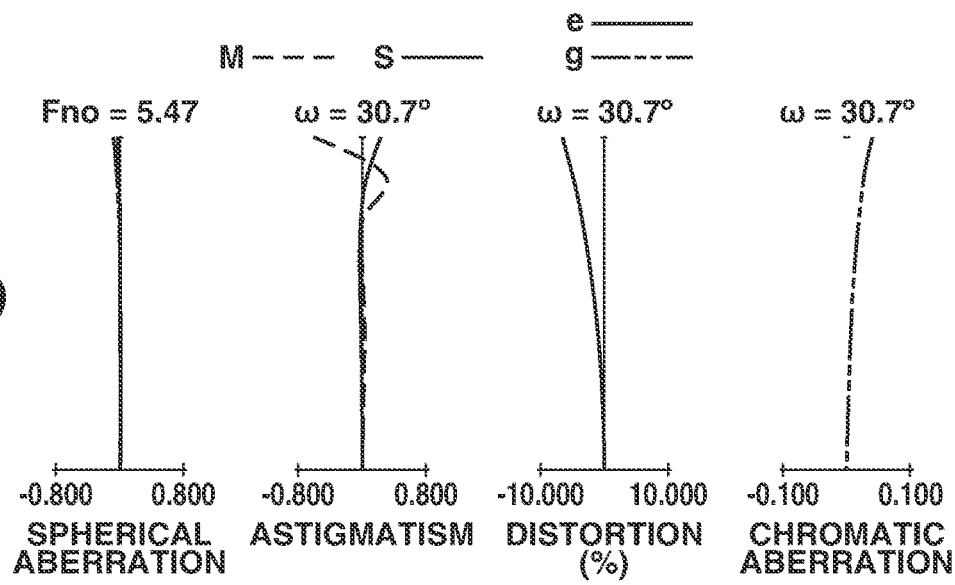
Figure 2E:
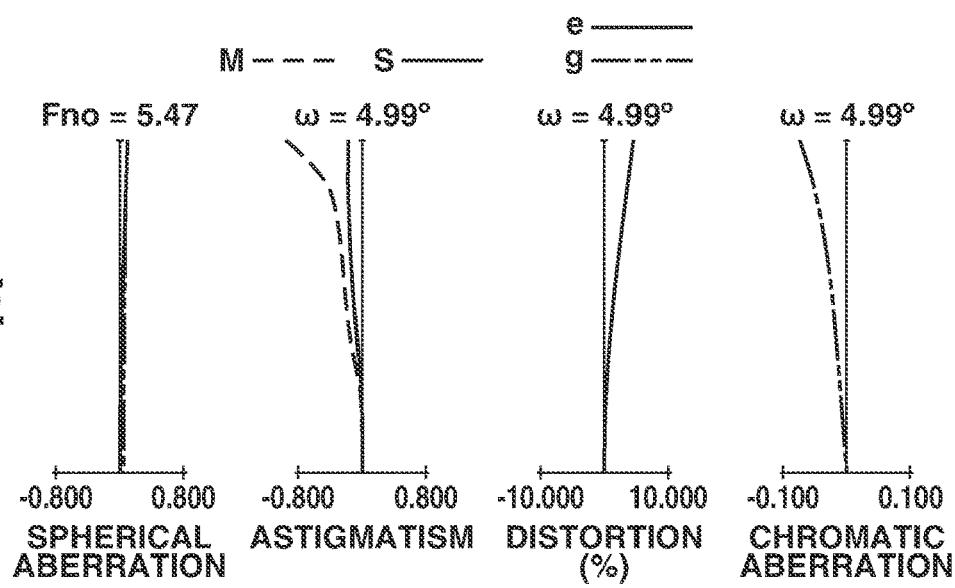
Figure 2F:
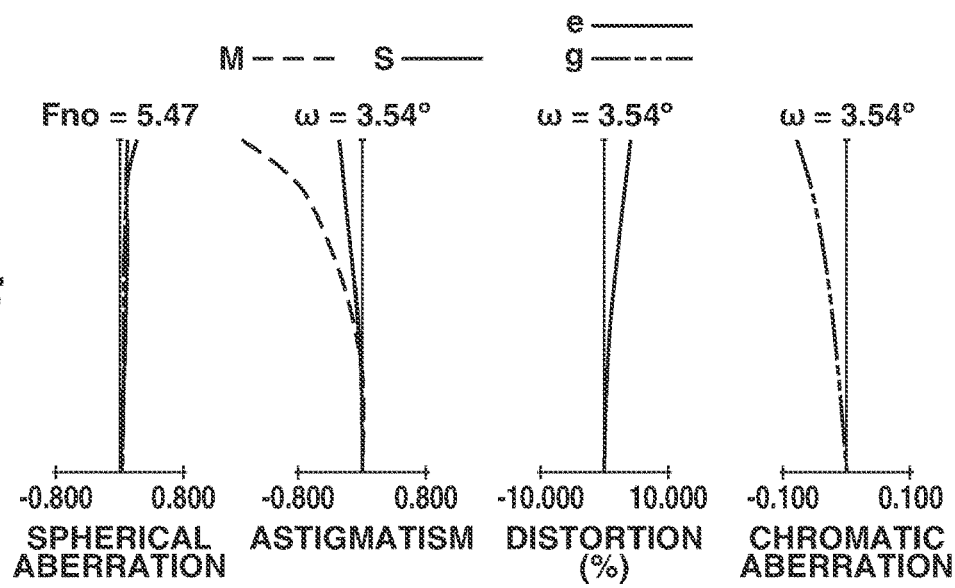

FIGS. 2A to 2F are aberration diagrams of the zoom lens according to the present exemplary embodiment (Numerical Example 1 corresponding to the present exemplary embodiment). FIGS. 2A, 2B, and 2C illustrate longitudinal aberrations in a state where the zoom lens is set at the wide-angle end, in a state where a focal length is 177.00 mm, and in a state where the zoom lens is set at the telephoto end, respectively, in a state where a focus is placed on an object at infinity and the extender lens unit is removed. FIGS. 2D, 2E, and 2F illustrate longitudinal aberrations in a state where the zoom lens is set at the wide-angle end, in a state where a focal length is 260.19 mm, and in a state where the zoom lens is set at the telephoto end, respectively, in a state where a focus is placed on an object at infinity and the extender lens unit is inserted.

In the longitudinal aberration diagrams, spherical aberration is aberration with respect to an e-line (solid line) and a g-line (dotted line). Astigmatism is aberration on a meridional image plane (dotted line) and a sagittal image plane (solid line) with respect to the e-line. Magnification chromatic aberration is aberration with respect to the g-line (dotted line). Fno denotes an F-number and ω denotes a half field angle. A scale in the longitudinal aberration diagrams defines that, in a state where the extender lens unit is removed, spherical aberration is 0.4 mm, astigmatism is 0.4 mm, distortion is 10%, and magnification chromatic aberration is 0.1 mm. The same scale defines that, in a state where the extender lens unit is inserted, spherical aberration is 0.8 mm, astigmatism is 0.8 mm, distortion is 10%, and magnification chromatic aberration is 0.1 mm. The wide-angle end and the telephoto end correspond to the ends of a movable range of the second lens unit U2. Graph legends in longitudinal aberration diagrams in other examples are given similarly to the graph legends in these longitudinal aberration diagrams.

In the present exemplary embodiment, a zoom ratio is 9.62 and magnification of the extender lens unit is 1.47. In a state where the extender lens unit is removed, a half field angle at the wide-angle end is 29.7 degrees, a half field angle at the telephoto end is 3.39 degrees, and a maximum image height is 14.8 mm. In a state where the extender lens unit is inserted, a maximum image height is increased to 21.64 mm.

An extender lens unit incorporated in a zoom lens supporting a large-sized image pickup element such as a zoom lens used for film image capturing is to ensure a light amount up to the end of the image pickup element. Therefore an effective diameter of a lens closest to an image is determined based on an off-axis light, and a ratio between an effective diameter of a lens closest to an object and an effective diameter of a lens closest to an image becomes smaller than enlargement magnification (transverse magnification) of the extender lens unit. Because an effective diameter of a lens closest to the image in a lens unit closest to the image (rear relay lens unit; R2 lens unit) also is to be determined based on an off-axis light, an effective diameter of a lens on the image side of the extender lens unit increases, and the zoom lens upsizes. The zoom lens according to the present exemplary embodiment blunts an incident angle of an off-axis light to the extender lens unit by causing a converging on-axis light to enter the extender lens unit. Furthermore, an effective diameter of a lens of the extender lens unit that is closest to the image is appropriately set. With such a configuration, the present exemplary embodiment can provide a zoom lens incorporating an extender lens unit that is beneficial from the aspects of a large image circle, downsizing, and high optical performance.

The zoom lens according to the present exemplary embodiment includes, in order from an object side to an image side, the first lens unit that does not move for zooming, and a plurality of zooming lens units that moves for zooming. The zoom lens further includes the R1 lens unit that does not move for zooming, the extender lens unit insertable and removable into and from an optical path, and the R2 lens unit that does not move for zooming. The zoom lens according to the present exemplary embodiment satisfies the following inequalities:

$$0.50 < (Def/Der)/\beta e + (1 - few/feF) < 1.75 \quad (1), \text{and}$$

$$0.50 < (le/Der)/\beta e < 1.22 \quad (2),$$

where few is a focal length of the zoom lens in a state where the extender lens unit is inserted and the zoom lens is set at the wide-angle, feF is a combined focal length from the first lens unit to the R1 lens unit, Def is an effective diameter of a lens of the extender lens unit that is closest to an object, Der is an effective diameter of the extender lens unit that is closest to an image, βe is transverse magnification of the extender lens unit, and le is an overall thickness (a distance on the optical axis from a lens surface closest to an object to a lens surface closest to an image) of the extender lens unit.

An effective diameter of the zoom lens on each surface is defined as a double of a maximum light ray height on the corresponding surface. The maximum light ray height in a lens or a lens unit is assumed to be the maximum light ray height among a plurality of maximum light ray heights on a plurality of surfaces included in the lens or the lens unit. Inequality (1) defines a relationship between the following three amounts a to c.

a) A ratio between the effective diameter of the lens of the extender lens unit that is closest to the object and the effective diameter of the lens of the extender lens unit that is closest to the image
b) Transverse magnification of the extender lens unit
c) A ratio between the focal length of the zoom lens in a state where the extender lens unit is inserted and the zoom lens is set at the wide-angle end, and a combined focal length of lens units of the zoom lens that are on the object side of the extender lens unit At this time, the amount c) defined as (few/feF) indicates an incident angle of a paraxial on-axis light to the extender lens unit, and when the paraxial on-axis light is parallel to the optical axis, (few/feF) becomes 0. The more the paraxial on-axis light converges, the more (few/feF) becomes a value larger than 0. In other words, Inequality (1) defines a relationship between the incident angle of the paraxial on-axis light to the extender lens unit and an effective diameter of the extender lens unit. The converging paraxial on-axis light means that an incident angle of an off-axis light becomes smaller. If a value of Inequality (1) exceeds an upper limit, a diameter of a lens on the image side of the extender lens unit becomes too large, which is not beneficial from the aspect of downsizing of the zoom lens. If a value of Inequality (1) falls below a lower limit, although the zoom lens becomes beneficial from the aspect of downsizing of the zoom lens, refractive power of each lens of the extender lens unit becomes too large, which is not beneficial from the aspect of aberration correction of the zoom lens.

In one embodiment, the zoom lens satisfies the following inequality:

$$1.00 < (Def/Der)/\beta e + (1 - few/feF) < 1.73 \quad (1a)$$

Inequality (2) defines a relationship between the following two amounts d and e.
d) A ratio between an overall thickness of the extender lens unit and an effective diameter of the lens of the extender lens unit that is closest to the image
e) Transverse magnification of the extender lens unit By satisfying Inequality (2), the zoom lens becomes beneficial from the aspects of downsizing of the extender lens unit and high optical performance over the entire zoom range. If a value of Inequality (2) exceeds an upper limit, the overall thickness of the extender lens unit becomes too large and refractive power of each lens becomes too small, which is beneficial from the aspect of aberration correction, but the zoom lens becomes not beneficial from the aspect of downsizing of the extender lens unit. If a value of Inequality (2) falls below a lower limit, although the zoom lens becomes beneficial from the aspect of downsizing of the extender lens unit, refractive power of each lens becomes too large, which is not beneficial from the aspect of aberration correction.

In one embodiment, the zoom lens satisfies the following inequality:

$$0.70 < (le/Der)/\beta e < 1.20 \quad (2a).$$

By satisfying Inequalities (1) and (2), the zoom lens according to the present exemplary embodiment can provide a zoom lens incorporating an extender lens unit that is beneficial from the aspects of a large image circle, downsizing, and high optical performance.

The zoom lens according to the present exemplary embodiment further satisfies the following inequality (3):

$$0.10 < few/feF < 1.00 \quad (3).$$

By satisfying Inequality (3), the zoom lens becomes beneficial from the aspects of downsizing and high optical performance over the entire zoom range. If a value of Inequality (3) exceeds an upper limit, an incident angle of an on-axis light to the extender lens unit becomes too large (an incident angle of an off-axis light becomes too small), which is beneficial from the aspect of downsizing of the zoom lens. Although the zoom lens becomes beneficial, refractive power of each lens of the extender lens unit becomes too large, which is not beneficial from the aspect of aberration correction of the zoom lens. If a value of Inequality (3) falls below a lower limit, an incident angle of an on-axis light to the extender lens unit becomes close to parallel to the optical axis (an incident angle of an off-axis light becomes too large), and an effective diameter of a lens on the image side of the extender lens unit becomes too large, which is not beneficial from the aspect of downsizing of the zoom lens.

In one embodiment, the zoom lens satisfies the following inequality:

$$0.20 < few/fF < 0.80 \quad (3a).$$

The zoom lens according to the present exemplary embodiment further satisfies the following inequality (4)

$$0.10 < few/f1 < 0.80 \quad (4),$$

where f1 is a focal length of the first lens unit.

By satisfying Inequality (4), the zoom lens becomes beneficial from the aspects of a sufficient light amount in a large image circle, high optical performance, and downsizing. If a value of Inequality (4) exceeds an upper limit, although the zoom lens becomes beneficial from the aspect of a light amount, the focal length f1 becomes relatively small. The zoom lens therefore becomes not beneficial from the aspect of aberration correction of the zoom lens. If a value of Inequality (4) falls below a lower limit, although the zoom lens becomes beneficial from the aspect of aberration correction of the zoom lens, the zoom lens becomes not beneficial from the aspect of a light amount. If a lens diameter is increased for ensuring a light amount, the zoom lens becomes not beneficial from the aspect of downsizing.

In one embodiment, the zoom lens satisfies the following inequality:

$$0.20 < few/f1 < 0.70 \quad (4a).$$

The zoom lens according to the present exemplary embodiment further satisfies the following inequality (5):

$$0.30 < \beta z < 0.70 \quad (5),$$

where βz is transverse magnification of a zooming lens unit that has negative refractive power and is closest to the image among a plurality of zooming lens units that moves for zooming.

By satisfying Inequality (5), the zoom lens becomes beneficial from the aspects of high optical performance over the entire zoom range and downsizing. If a value of Inequality (5) exceeds an upper limit, aberration is excessively augmented due to too large transverse magnification βz, which is not beneficial from the aspect of aberration correction of the zoom lens. If a value of Inequality (5) falls below a lower limit, the transverse magnification βz becomes small, and a movement amount of a lens unit having the transverse magnification βz increases for obtaining a high zooming ratio. The total lens length therefore increases, which is not beneficial from the aspect of downsizing.

In one embodiment, the zoom lens satisfies the following inequality:

$$0.40 < \beta z < 0.60 \tag{5a}$$

The zoom lens according to the present exemplary embodiment further satisfies the following inequality (6):

$$1.20 < \beta e < 1.80 \tag{6}$$

where βe is transverse magnification of the extender lens unit.

By satisfying Inequality (6), the zoom lens becomes beneficial from the aspects of high optical performance over the entire zoom range and downsizing. If a value of Inequality (6) exceeds an upper limit, for obtaining high optical performance, the extender lens unit becomes too large in the direction of the optical axis. If a value of Inequality (6) falls below a lower limit, although the zoom range becomes beneficial from the aspect of aberration correction of the zoom lens, a lens diameter of the extender lens unit becomes too large.

In one embodiment, the zoom lens satisfies the following inequality:

$$1.30 < \beta e < 1.70 \tag{6a}$$

The zoom lens according to the present exemplary embodiment satisfies the following inequality (7):

$$1.00 < (R12+R11)/(R12-R11) < 2.00 \tag{7}$$

where R11 is a curvature radius of a surface on the object side of a single lens of the extender lens unit that is closest to the object, and R12 is a curvature radius of a surface on the image side of the single lens.

Satisfying Inequality (7) means that the single lens is a convex meniscus lens. If a value of Inequality (7) exceeds an upper limit, although the zoom lens becomes beneficial from the aspect of aberration correction of the zoom lens, the zoom lens becomes not beneficial from the aspect of downsizing of the extender lens unit. If a value of Inequality (7) falls below a lower limit, because the single lens becomes a biconvex lens, although the zoom lens becomes beneficial from the aspect of downsizing, the zoom lens becomes not beneficial from the aspect of aberration correction of the zoom lens.

In one embodiment, the zoom lens satisfies the following inequality:

$$1.10 < (R12+R11)/(R12-R11) < 1.7 \tag{7a}$$

The zoom lens according to the present exemplary embodiment further satisfies the following inequality (8):

$$0.25 < hr/Der < 0.50 \tag{8}$$

where hr is a height of an on-axis light on a surface of the extender lens unit that is closest to an image in a state where a focus is placed on an object at infinity and the zoom lens is set at the wide-angle end.

By satisfying Inequality (8), the zoom lens becomes beneficial from the aspects of a light amount in an image circle peripheral portion and downsizing of the extender lens unit. If a value of Inequality (8) exceeds an upper limit, although the zoom lens becomes beneficial from the aspect of downsizing of the extender lens unit, the zoom lens becomes not beneficial from the aspect of a light amount in an image circle peripheral portion. If a value of Inequality (8) falls below a lower limit, although the zoom lens becomes beneficial from the aspect of a light amount in an image circle peripheral portion, the zoom lens becomes not beneficial from the aspect of downsizing of the zoom lens.

In one embodiment, the zoom lens satisfies the following inequality:

$$0.30 < hr/Der < 0.48 \tag{8a}$$

The zoom lens according to the present exemplary embodiment further satisfies the following inequality (9):

$$1.00 < fe1/Der < 3.80 \tag{9}$$

where fe1 is a focal length of a lens of the extender lens unit that is closest to the object.

By satisfying Inequality (9), the zoom lens becomes beneficial from the aspects of downsizing of the extender lens unit, a light amount in an image circle peripheral portion, and high optical performance over the entire zoom range. If a value of Inequality (9) exceeds an upper limit, although the zoom lens becomes beneficial from the aspect of aberration correction of the zoom lens because refractive power of the lens becomes too small, the zoom lens becomes not beneficial from the aspect of downsizing of the extender lens unit, and becomes not beneficial also from the aspect of a light amount in an image circle peripheral portion. If a value of Inequality (9) falls below a lower limit, although the zoom lens becomes beneficial from the aspects of downsizing of the extender lens unit and a light amount in an image circle peripheral portion, the zoom lens becomes not beneficial from the aspect of aberration correction of the zoom lens because refractive power of the lens becomes too large.

In one embodiment, the zoom lens satisfies the following inequality:

$$1.50 < fe1/Der < 3.70 \tag{9a}$$

Numerical value data of Numerical Example 1 corresponding to the first exemplary embodiment will be described below. In each numerical example, r is a curvature radius of each surface, d is each surface interval, and vd is an Abbe number. In addition, nd is an absolute refractive index at the pressure of 1 with respect to a d-line of Fraunhofer lines. Ng, NF, Nd, and NC are refractive indices with respect to a g-line, an F-line, a d-line, and a C-line of Fraunhofer lines, respectively. The definitions of the Abbe number vd and a partial dispersion ratio θgf are similar to generally-used definitions. More specifically, the Abbe number vd and the partial dispersion ratio θgf are represented as follows:

$$vd = (Nd-1)/(NF-NC),$$

$$\theta gf = (Ng-NF)/(NF-NC).$$

An aspherical shape is represented assuming that an X-axis is set to the direction of the optical axis, an H-axis is set to a direction orthogonal to the direction of the optical axis, and a travelling direction of light is set as a positive direction. The aspherical shape is represented by the following formula:

$$X = \frac{H^2/R}{1+\sqrt{1-(1+k)(H/R)^2}} + A4H^4 + A6H^6 + A8H^8 +$$
$$A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

[Math. 1]

where R is a paraxial curvature radius, k is a conic constant, and A3, A4, A5, A6, A7, A8, A9, A10, A11, A12, A13, A14, A15, and A16 are aspherical surface coefficients.

A focal length, an F-number, and a field angle indicate values in a state where a focus is placed on an object at infinity. BF is a distance from a final lens surface to an image plane. In addition, "e-Z" means "×10$^{-Z}$".

Table 1 described below lists values in the inequalities in Numerical Example 1. Numerical Example 1 can provide a zoom lens that satisfies all the inequalities (1) to (9) and incorporates an extender lens unit that is beneficial from the aspects of a large image circle, downsizing, and high optical performance over the entire zoom range.

Second Exemplary Embodiment

Figure 3:
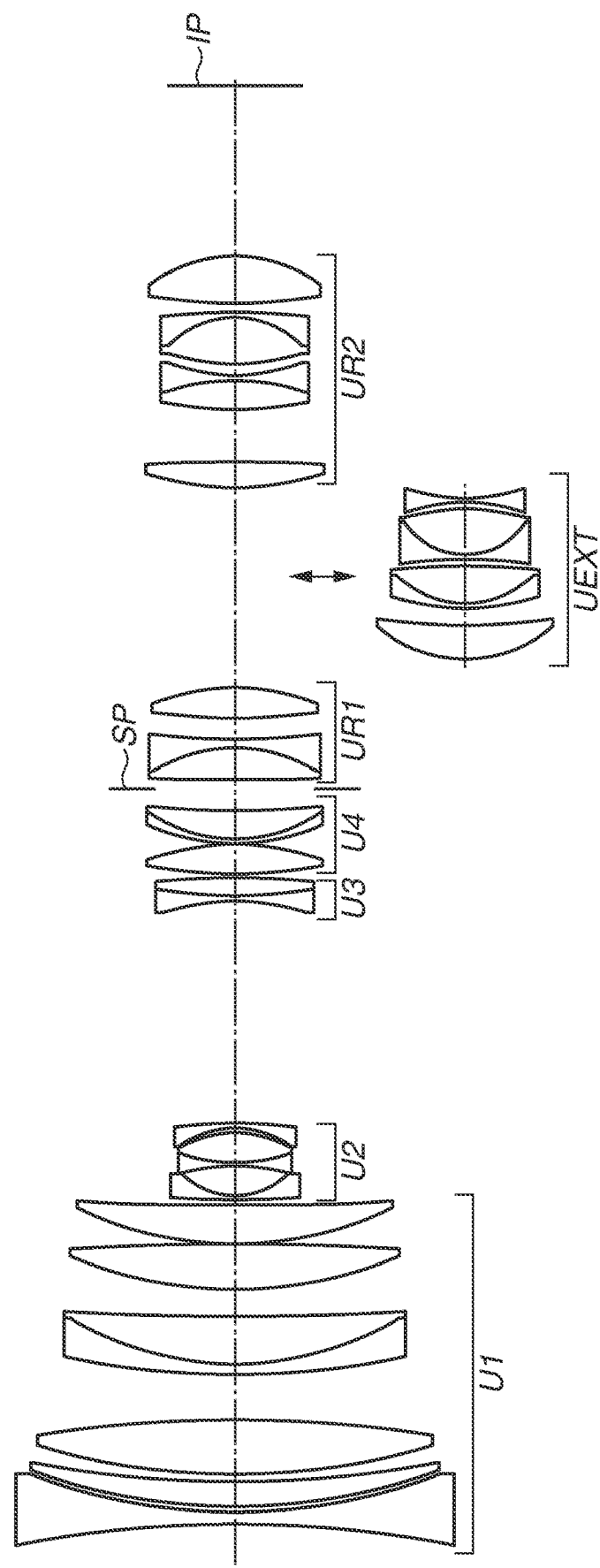
FIG. 3 is a cross-sectional diagram illustrating a zoom lens according to a second exemplary embodiment that is set at a wide-angle end and in a state where a focus is placed on an object at infinity.

FIG. 3 is a cross-sectional diagram illustrating a zoom lens according to the second exemplary embodiment that is set at a wide-angle end and in a state where a focus is placed on an object at infinity and an extender lens unit is removed. The zoom lens illustrated in FIG. 3 includes a first lens unit U1 that has positive refractive power, and does not move for zooming. A partial lens unit of the first lens unit U1 can move for focusing along an optical axis. The zoom lens further includes a second lens unit U2 (first variator) having negative refractive power. The second lens unit U2 moves (monotonously, for example) toward an image side along an optical axis for zooming from a wide-angle end to a telephoto end. The zoom lens further includes a third lens unit U3 (second variator) having negative refractive power. The third lens unit U3 moves (non-monotonously, for example) along the optical axis for the zooming. The zoom lens further includes a fourth lens unit U4 (compensator) having positive refractive power. The fourth lens unit U4 moves (non-monotonously, for example) along the optical axis for the zooming (correction (compensation) of a variation in an image plane position that is attributed to the zooming). The zoom lens further includes an aperture stop SP. The zoom lens further includes a lens unit UR1 (front relay lens unit; R1 lens unit) that does not move for zooming. The zoom lens further includes a lens unit UR2 (rear relay lens unit; R2 lens unit) that does not move for zooming. An image plane IP corresponds to a plane on which a light receiving surface of an image pickup element (photoelectric conversion element) that receives light of an image formed by the zoom lens is arranged. The zoom lens further includes an extender lens unit UEXT (EXT lens unit) to be inserted or removed into or from an optical path between the R1 lens unit and the R2 lens unit (typically, an optical path of afocal light) for changing a focal length range of the zoom lens.

The configuration of each lens unit will now be described. Hereinafter, in each lens unit, lenses are arranged in order from an object side to an image side. The first lens unit U1 includes first to 13th surfaces, and consists of a negative lens, a positive lens, a positive lens, a cemented lens of a negative lens and a positive lens, a positive lens, and a positive lens (seven lenses). The second lens unit U2 includes 14th to 20th surfaces, and consists of a negative lens, a cemented lens of a negative lens and a positive lens, and a negative lens (four lenses). The third lens unit U3 includes 21st to 23rd surfaces, and consists of a cemented lens of a negative lens and a positive lens (two lenses). The fourth lens unit U4 includes 24th to 28th surfaces, and consists of a positive lens, and a cemented lens of a negative lens and a positive lens (three lenses). The lens unit UR1 includes 30th to 34th surfaces, and consists of a cemented lens of a positive lens and a negative lens, and a positive lens (three lenses). The lens unit UR2 includes 35th to 44th surfaces, and consists of a positive lens, a cemented lens of a positive lens and a negative lens, a cemented lens of a positive lens and a negative lens, and a positive lens (six lenses). The extender lens unit UEXT is insertable and removable into and from an optical path between the 34th and 35th surfaces, and consists of a positive lens, a cemented lens of a negative lens and a positive lens, a cemented lens of a negative lens and a positive lens, and a negative lens (six lenses).

Figure 4A:
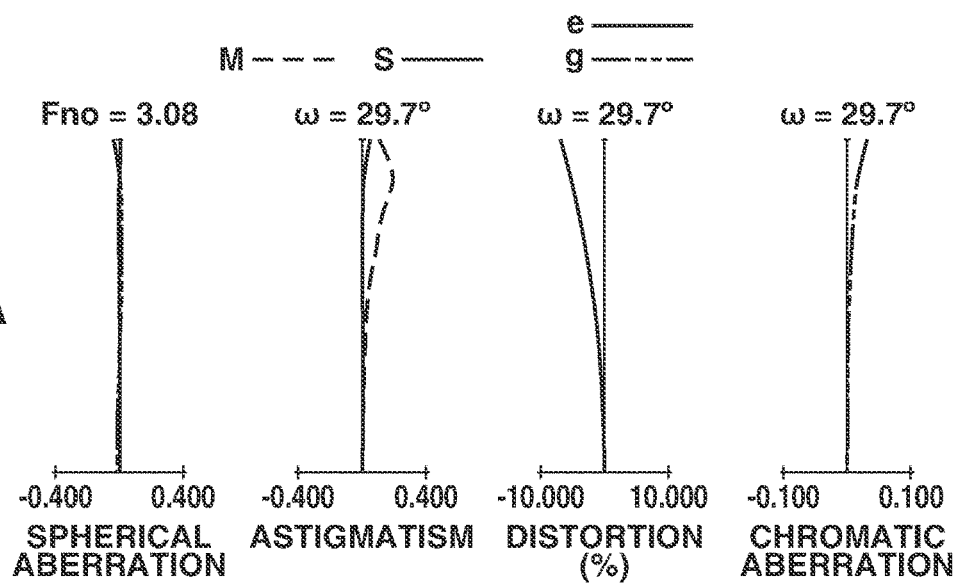
FIGS. 4A to 4F are aberration diagrams of the zoom lens according to the second exemplary embodiment.
Figure 4B:
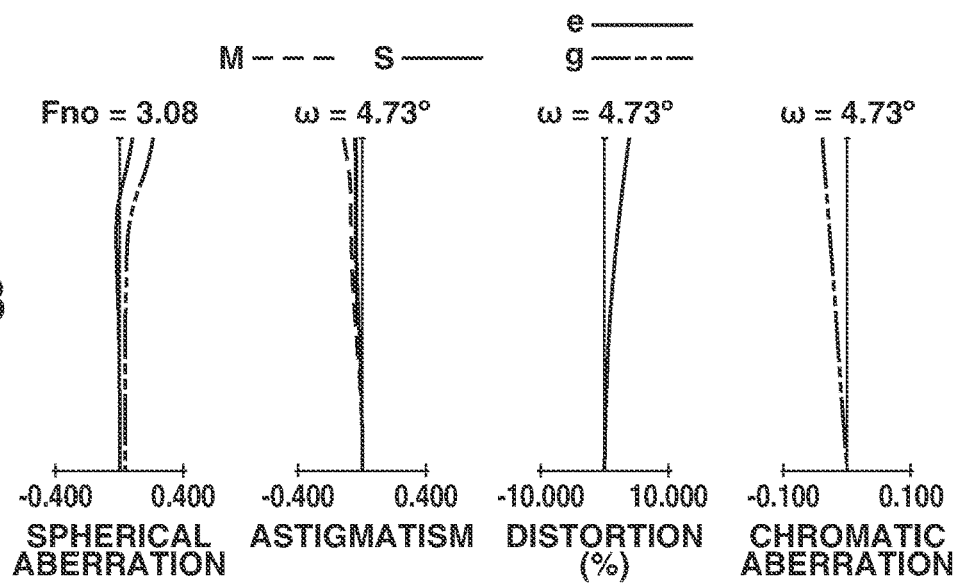
Figure 4C:
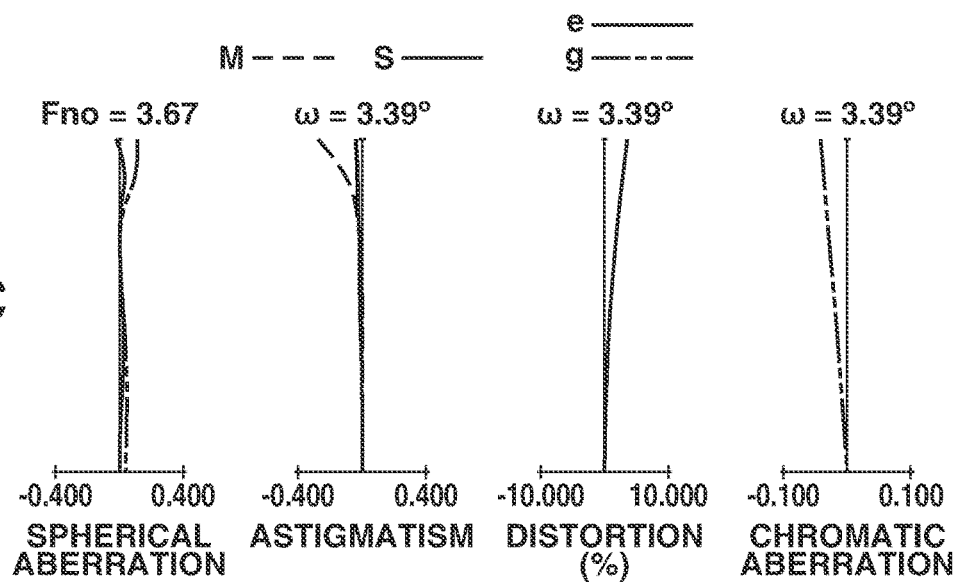
Figure 4D:
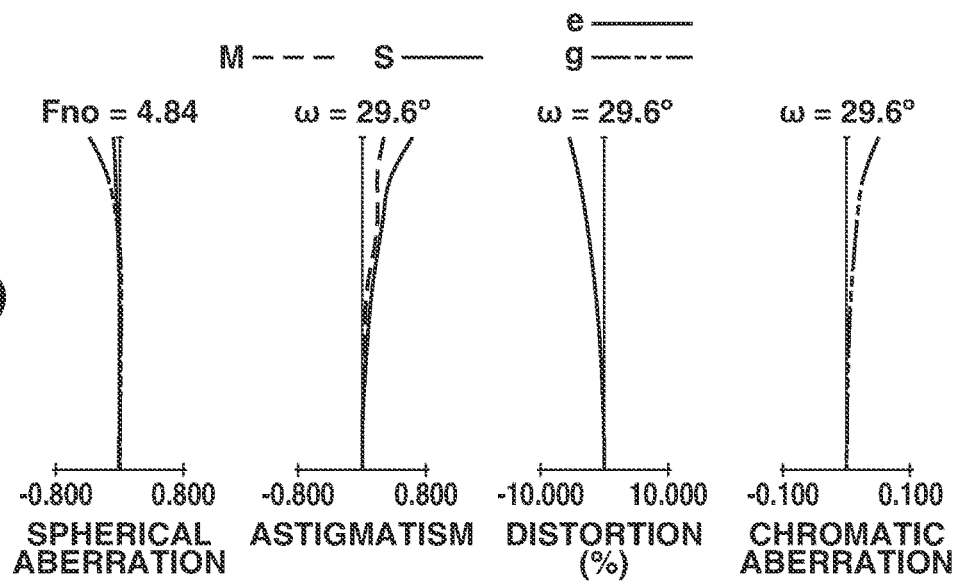
Figure 4E:
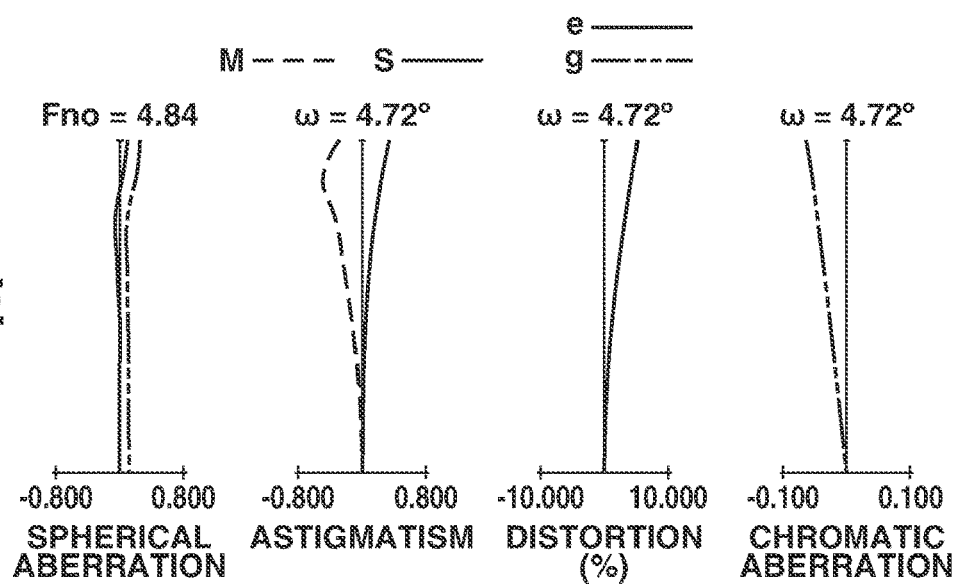
Figure 4F:
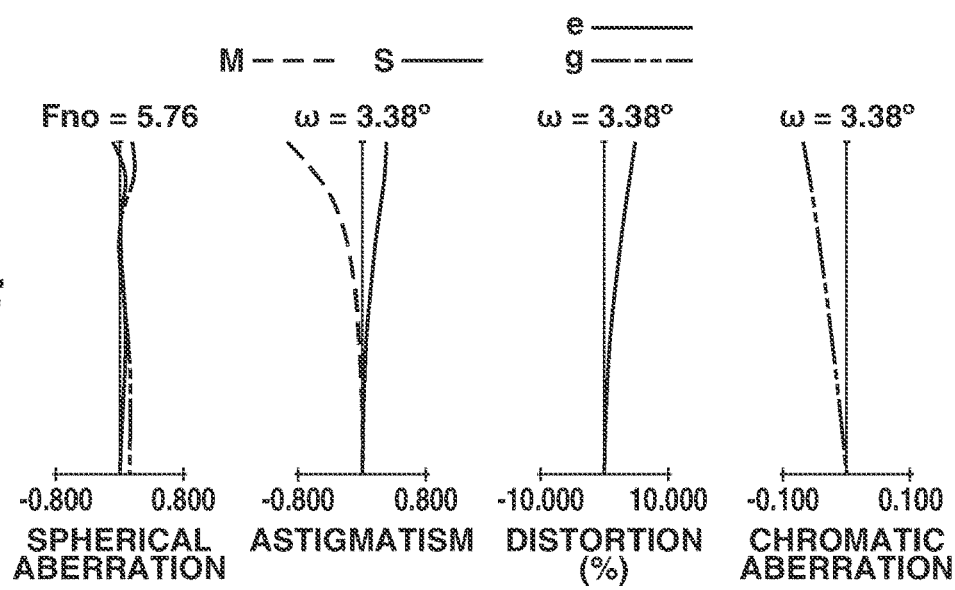

FIGS. 4A to 4F are aberration diagrams of the zoom lens according to the present exemplary embodiment (Numerical Example 2 corresponding to the present exemplary embodiment). FIGS. 4A, 4B, and 4C illustrate longitudinal aberrations in a state where the zoom lens is set at the wide-angle end, in a state where a focal length is 179.00 mm, and in a state where the zoom lens is set at the telephoto end, respectively, in a state where a focus is placed on an object at infinity and the extender lens unit is removed. FIGS. 4D, 4E, and 4F illustrate longitudinal aberrations in a state where the zoom lens is set at the wide-angle end, in a state where a focal length is 281.03 mm, and in a state where the zoom lens is set at the telephoto end, respectively, in a state where a focus is placed on an object at infinity and the extender lens unit is inserted.

In the present exemplary embodiment, a zoom ratio is 9.62 and magnification of the extender lens unit is 1.57. In a state where the extender lens unit is removed, a half field angle at the wide-angle end is 29.7 degrees, a half field angle at the telephoto end is 3.39 degrees, and a maximum image height is 14.8 mm. In a state where the extender lens unit is inserted, a maximum image height is increased to 23.20 mm.

Table 1 described below lists values in the inequalities in Numerical Example 2. Numerical Example 2 can provide a zoom lens that satisfies all the inequalities (1) to (9) and incorporates an extender lens unit that is beneficial from the aspects of a large image circle, downsizing, and high optical performance over the entire zoom range.

Third Exemplary Embodiment

Figure 5:
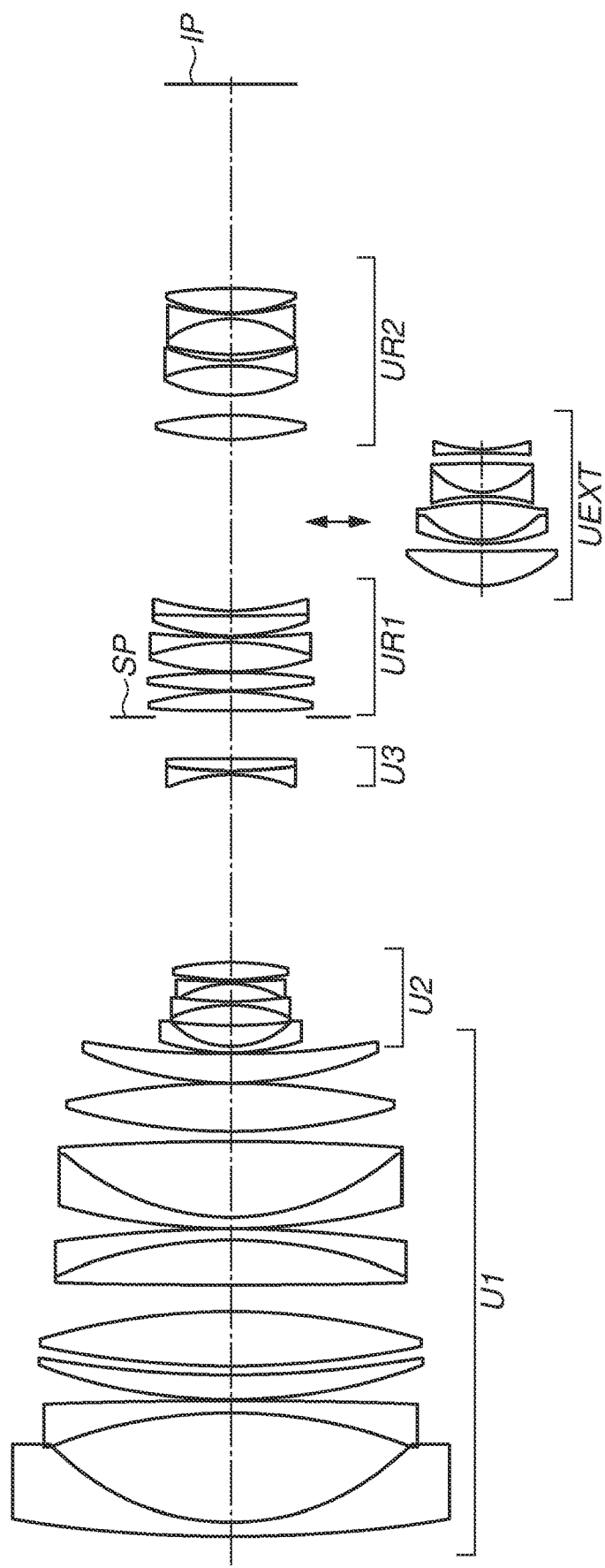
FIG. 5 is a cross-sectional diagram illustrating a zoom lens according to a third exemplary embodiment that is set at a wide-angle end and in a state where a focus is placed on an object at infinity.

FIG. 5 is a cross-sectional diagram illustrating a zoom lens according to the third exemplary embodiment that is set at a wide-angle end and in a state where a focus is placed on an object at infinity and an extender lens unit is removed. The zoom lens includes a first lens unit U1 that has positive refractive power, and does not move for zooming. A partial lens unit of the first lens unit U1 can move for focusing along an optical axis. The zoom lens further includes a second lens unit U2 (variator) having negative refractive power. The second lens unit U2 moves (monotonously, for example) toward an image side along an optical axis for zooming from a wide-angle end to a telephoto end. The zoom lens further includes a third lens unit U3 (compensator) having negative refractive power. The third lens unit U3 moves (non-monotonously, for example) along the optical axis for the zooming (correction (compensation) of a variation in an image plane position that is attributed to the zooming). The zoom lens further includes an aperture stop SP. The zoom lens further includes a lens unit UR1 (front relay lens unit; R1 lens unit) that does not move for zooming. The zoom lens further includes a lens unit UR2 (rear relay lens unit; R2 lens unit) that does not move for zooming. An image plane IP corresponds to a plane on which a light receiving surface of an image pickup element (photoelectric conversion element) that receives light of an image formed by the zoom lens is arranged. The zoom lens further includes an extender lens unit UEXT (EXT lens unit) to be inserted or removed into or from an optical path between the R1 lens unit and the R2 lens unit (typically, an optical path of afocal light) for changing a focal length range of the zoom lens.

The configuration of each lens unit will now be described. Hereinafter, in each lens unit, lenses are arranged in order from an object side to an image side. The first lens unit U1 includes first to 18th surfaces, and consists of a negative lens, a negative lens, a positive lens, a positive lens, a cemented lens of a positive lens and a negative lens, a cemented lens of a negative lens and a positive lens, a positive lens, and a positive lens (ten lenses). The second lens unit U2 includes 19th to 27th surfaces, and consists of a negative lens, a cemented lens of a positive lens and a negative lens, a negative lens, and a positive lens (five lenses). The third lens unit U3 includes 28th to 30th surfaces, and consists of a cemented lens of a negative lens and a positive lens (two lenses). The lens unit UR1 includes 32nd to 41st surfaces, and consists of a positive lens, a positive lens, a cemented lens of a positive lens and a negative lens, and a cemented lens of a positive lens and a negative lens (six lenses). The lens unit UR2 includes 42nd to 51st surfaces, and consists of a positive lens, a cemented lens of a positive lens and a negative lens, a cemented lens of a positive lens and a negative lens, and a positive lens (six lenses). The extender lens unit UEXT is insertable and removable into and from an optical path between the 41st and 42nd surfaces, and consists of a positive lens, a cemented lens of a negative lens and a positive lens, a cemented lens of a negative lens and a positive lens, and a negative lens (six lenses).

Figure 6A:
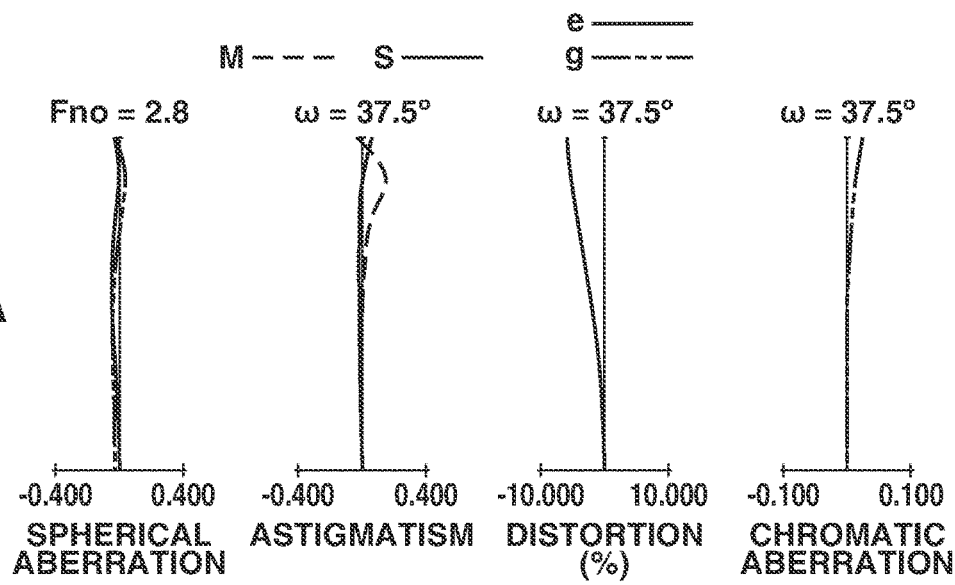
FIGS. 6A to 6F are aberration diagrams of the zoom lens according to the third exemplary embodiment.
Figure 6B:
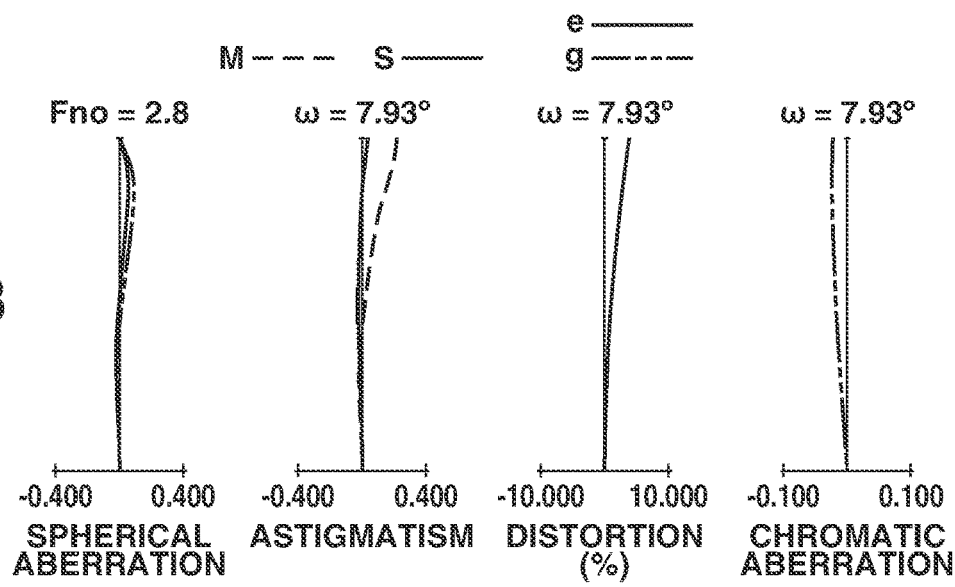
Figure 6C:
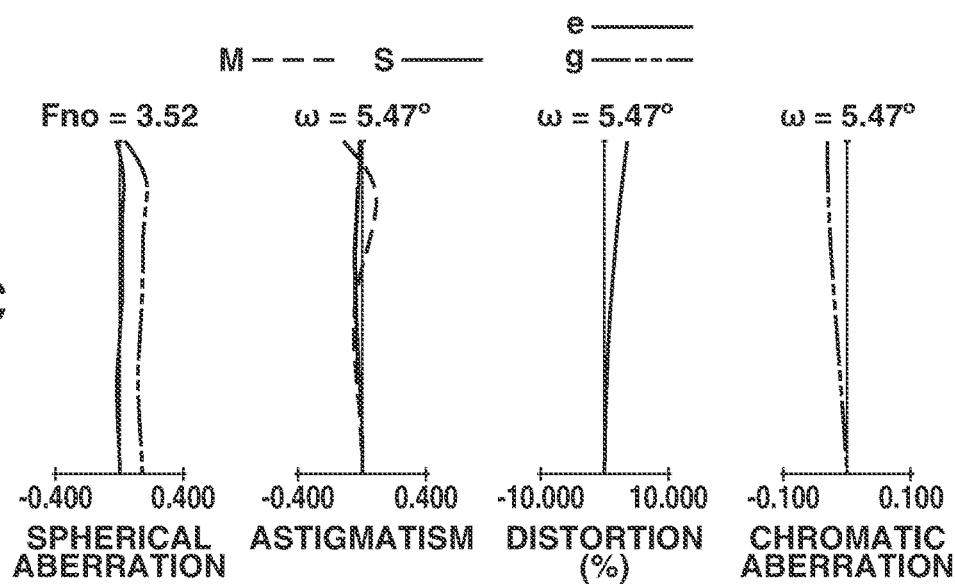
Figure 6D:
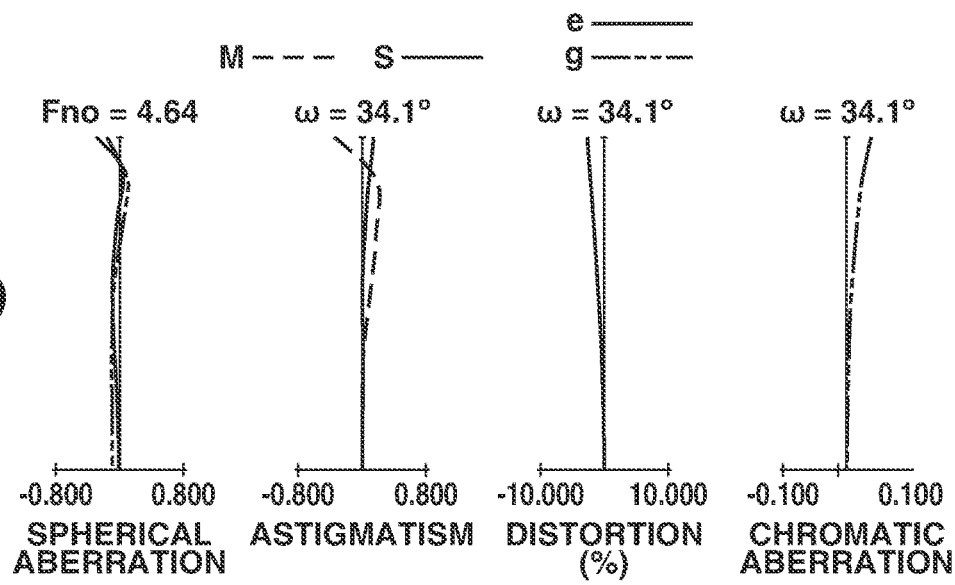
Figure 6E:
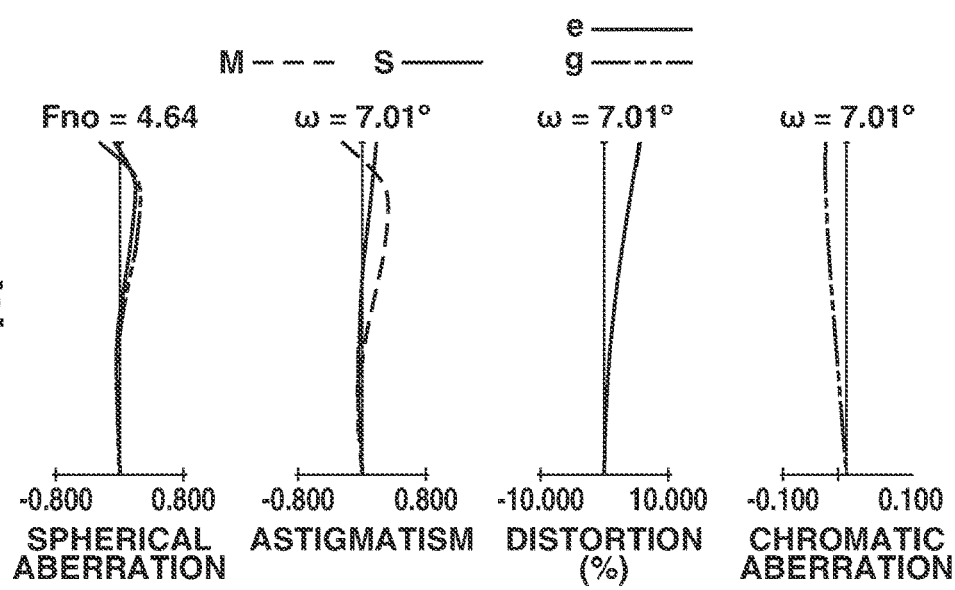
Figure 6F:
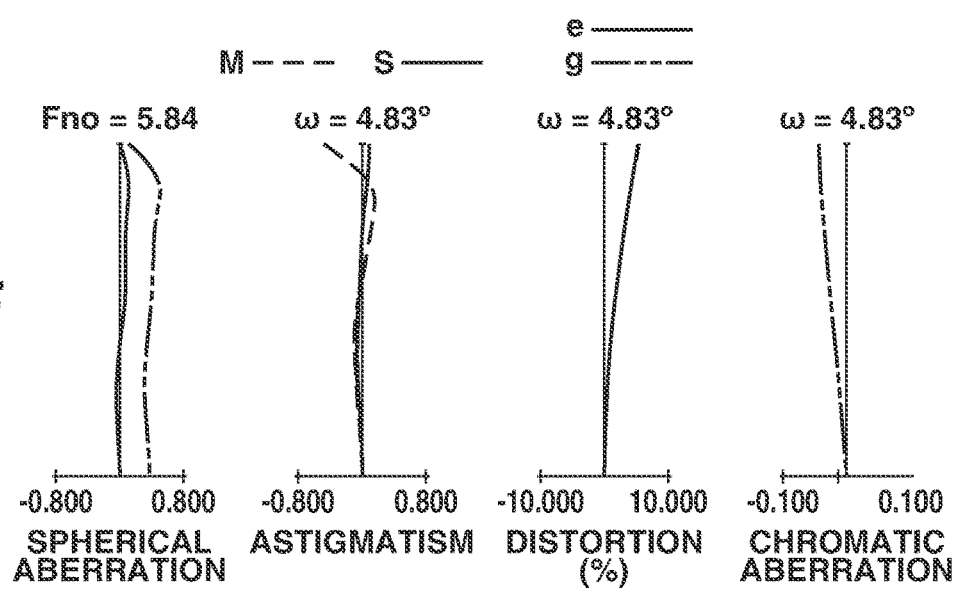

FIGS. 6A to 6F are aberration diagrams of the zoom lens according to the present exemplary embodiment (Numerical Example 3 corresponding to the present exemplary embodiment). FIGS. 6A, 6B, and 6C illustrate longitudinal aberrations in a state where the zoom lens is set at the wide-angle end, in a state where a focal length is 106.20 mm, and in a state where the zoom lens is set at the telephoto end, respectively, in a state where a focus is placed on an object at infinity and the extender lens unit is removed. FIGS. 6D, 6E, and 6F illustrate longitudinal aberrations in a state where the zoom lens is set at the wide-angle end, in a state where a focal length is 176.00 mm, and in a state where the zoom lens is set at the telephoto end, respectively, in a state where a focus is placed on an object at infinity and the extender lens unit is inserted.

In the present exemplary embodiment, a zoom ratio is 8.00 and magnification of the extender lens unit is 1.66. In a state where the extender lens unit is removed, a half field angle at the wide-angle end is 37.5 degrees, a half field angle at the telephoto end is 5.47 degrees, and a maximum image height is 14.8 mm. In a state where the extender lens unit is inserted, a maximum image height is increased to 21.64 mm.

Table 1 described below lists values in the inequalities in Numerical Example 3. Numerical Example 3 can provide a zoom lens that satisfies all the inequalities (1) to (9) and incorporates an extender lens unit that is beneficial from the aspects of a large image circle, downsizing, and high optical performance over the entire zoom range.

Fourth Exemplary Embodiment

Figure 7:
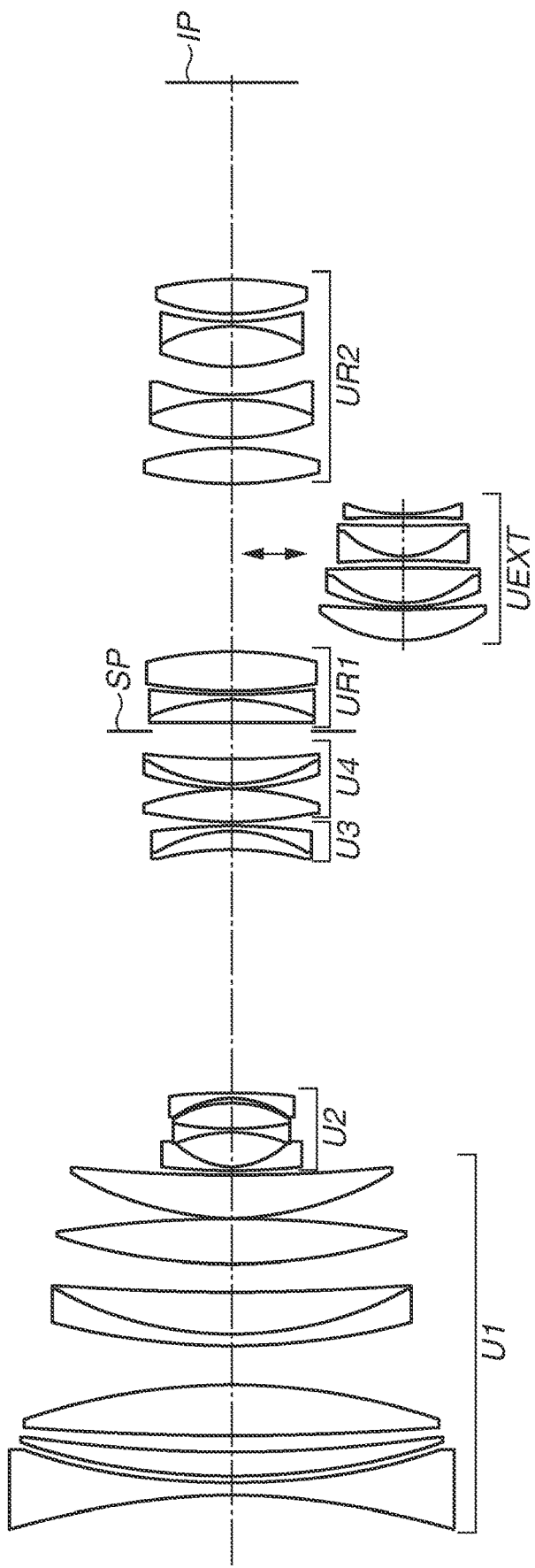
FIG. 7 is a cross-sectional diagram illustrating a zoom lens according to a fourth exemplary embodiment that is set at a wide-angle end and in a state where a focus is placed on an object at infinity.

FIG. 7 is a cross-sectional diagram illustrating a zoom lens according to the fourth exemplary embodiment that is set at a wide-angle end and in a state w a focus is placed on an object at infinity and an extender lens unit is removed. The zoom lens includes a first lens unit U1 that has positive refractive power, and does not move for zooming. A partial lens unit of the first lens unit U1 can move for focusing along an optical axis. The zoom lens further includes a second lens unit U2 (first variator) having negative refractive power. The second lens unit U2 moves (monotonously, for example) toward an image side along an optical axis for zooming from a wide-angle end to a telephoto end. The zoom lens further includes a third lens unit U3 (second variator) having negative refractive power. The third lens unit U3 moves (non-monotonously, for example) along the optical axis for the zooming. The zoom lens further includes a fourth lens unit U4 (compensator) having positive refractive power. The fourth lens unit U4 moves (non-monotonously, for example) along the optical axis for the zooming (correction (compensation) of a variation in an image plane position that is attributed to the zooming). The zoom lens further includes an aperture stop SP. The zoom lens further includes a lens unit UR1 (front relay lens unit; R1 lens unit) that does not move for zooming. The zoom lens further includes a lens unit UR2 (rear relay lens unit; R2 lens unit) that does not move for zooming. An image plane IP corresponds to a plane on which a light receiving surface of an image pickup element (photoelectric conversion element) that receives light of an image formed by the zoom lens is arranged. The zoom lens further includes an extender lens unit UEXT (EXT lens unit) to be inserted or removed into or from an optical path between the R1 lens unit and the R2 lens unit (typically, an optical path of afocal light) for changing a focal length range of the zoom lens.

The configuration of each lens unit will now be described. Hereinafter, in each lens unit, lenses are arranged in order from an object side to an image side. The first lens unit U1 includes first to 13th surfaces, and consists of a negative lens, a positive lens, a positive lens, a cemented lens of a negative lens and a positive lens, a positive lens, and a positive lens (seven lenses). The second lens unit U2 includes 14th to 20th surfaces, and consists of a negative lens, a cemented lens of a negative lens and a positive lens, and a negative lens (four lenses). The third lens unit U3 includes 21st to 23rd surfaces, and consists of a cemented lens of a positive lens and a negative lens (two lenses). The fourth lens unit U4 includes 24th to 28th surfaces, and consists of a positive lens, and a cemented lens of a negative lens and a positive lens (three lenses). The lens unit UR1 includes 30th to 34th surfaces, and consists of a cemented lens of a positive lens and a negative lens, and a positive lens (three lenses). The lens unit UR2 includes 35th to 44th surfaces, and consists of a positive lens, a cemented lens of a positive lens and a negative lens, a cemented lens of a positive lens and a negative lens, and a positive lens (six lenses). The extender lens unit UEXT is insertable and removable into and from an optical path between the 34th and 35th surfaces, and consists of a positive lens, a cemented lens of a negative lens and a positive lens, a cemented lens of a negative lens and a positive lens, and a negative lens (six lenses).

Figure 8A:
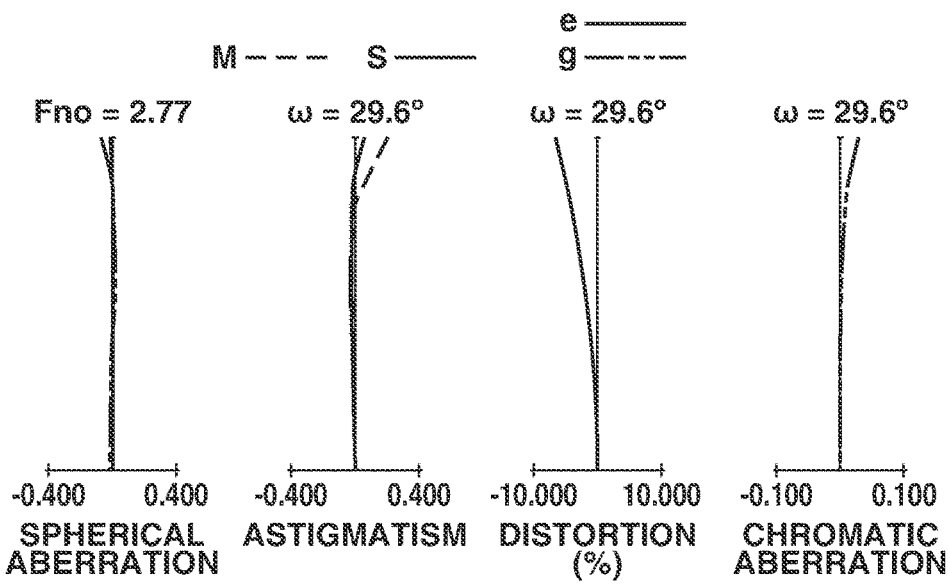
FIGS. 8A to 8F are aberration diagrams of the zoom lens according to the fourth exemplary embodiment.
Figure 8B:
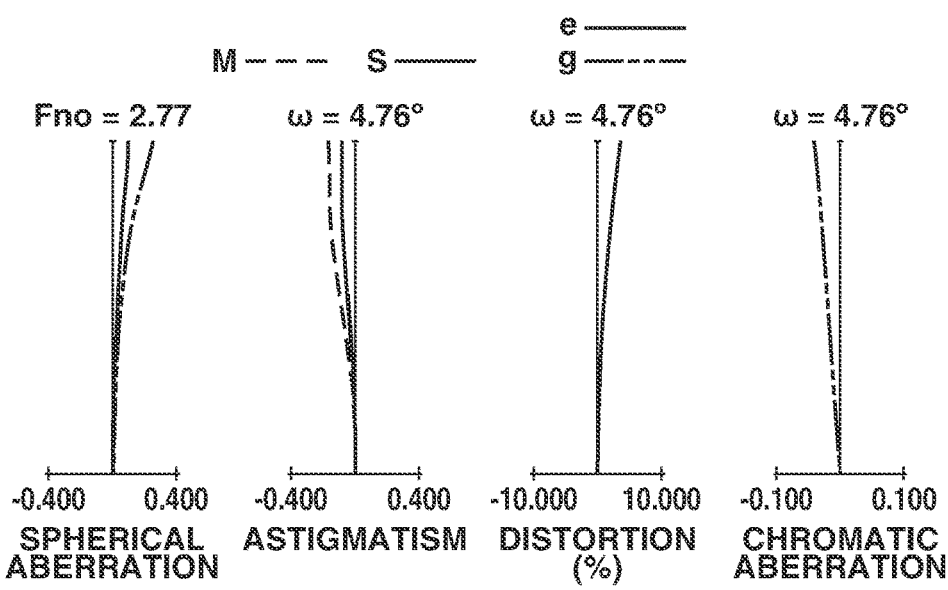
Figure 8C:
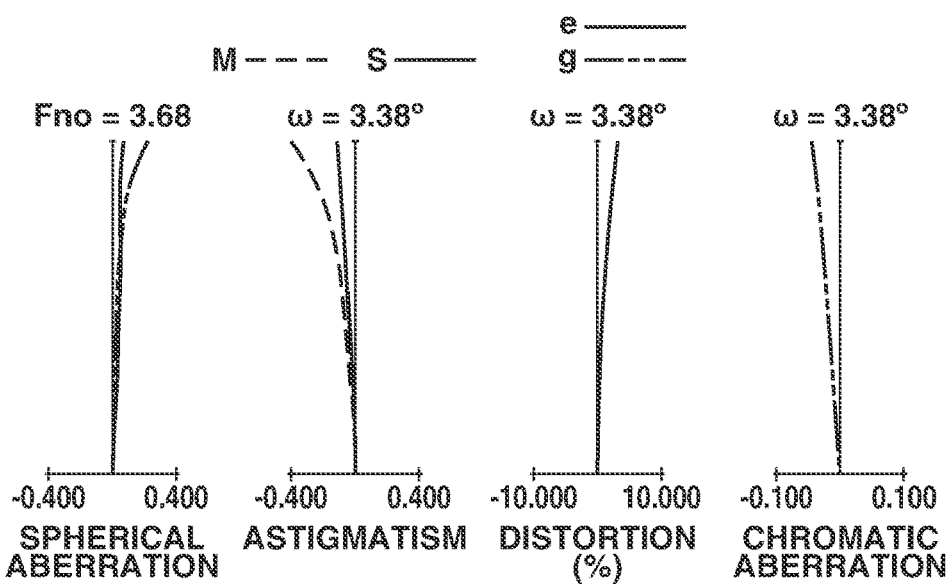
Figure 8D:
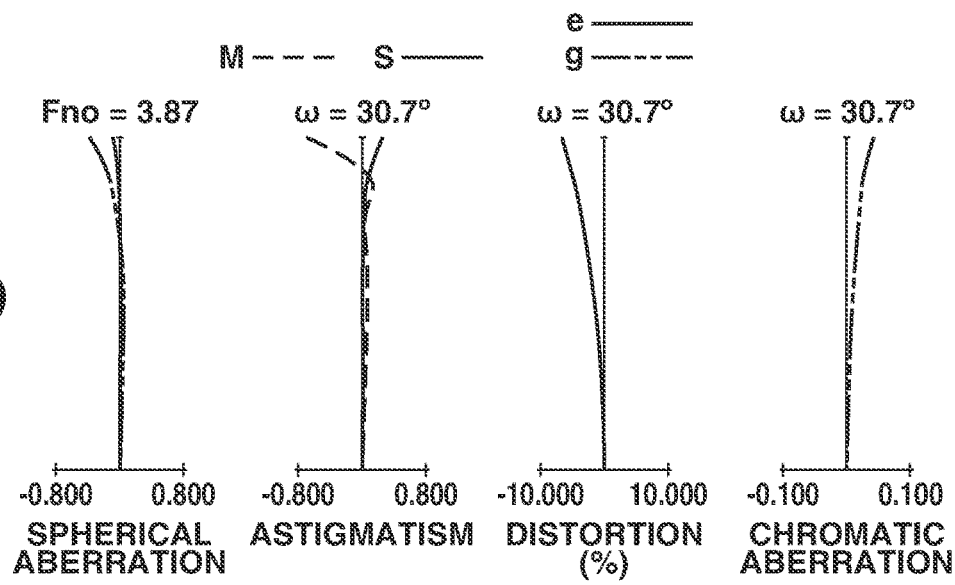
Figure 8E:
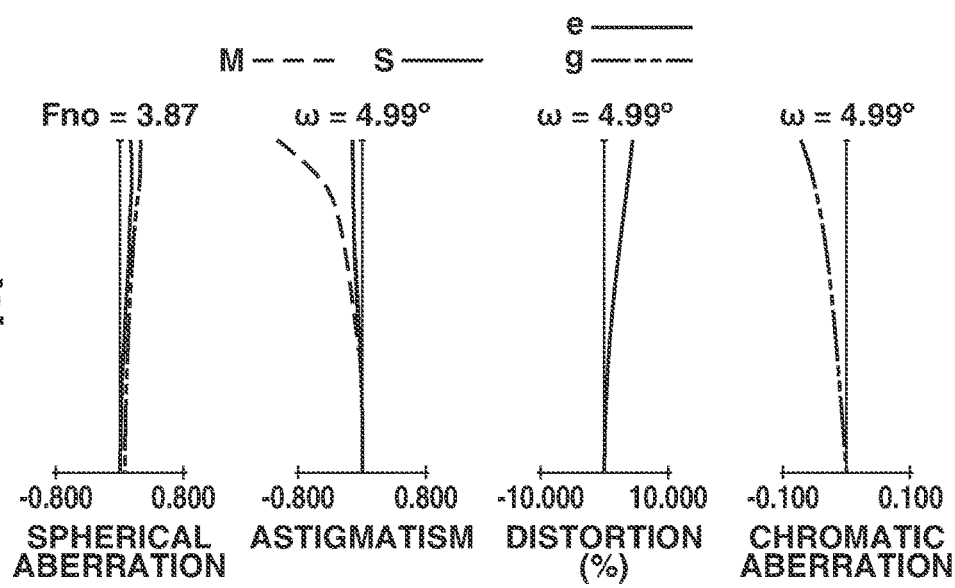
Figure 8F:
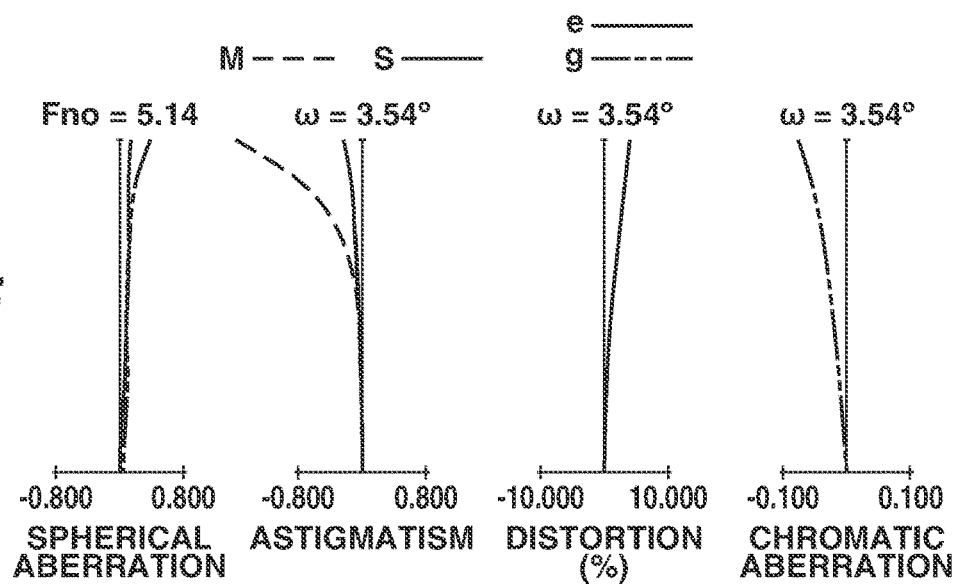

FIGS. 8A to 8F are aberration diagrams of the zoom lens according to the present exemplary embodiment (Numerical Example 4 corresponding to the present exemplary embodiment). FIGS. 8A, 8B, and 8C illustrate longitudinal aberrations in a state where the zoom lens is set at the wide-angle end, in a state where a focal length is 177.67 mm, and in a state where the zoom lens is set at the telephoto end, respectively, in a state where a focus is placed on an object at infinity and the extender lens unit is removed. FIGS. 8D, 8E, and 8F illustrate longitudinal aberrations in a state where the zoom lens is set at the wide-angle end, in a state where a focal length is 247.80 mm, and in a state where the zoom lens is set at the telephoto end, respectively, in a state where a focus is placed on an object at infinity and the extender lens unit is inserted.

In the present exemplary embodiment, a zoom ratio is 9.62 and magnification of the extender lens unit is 1.39. In a state where the extender lens unit is removed, a half field angle at the wide-angle end is 29.6 degrees, a half field angle at the telephoto end is 3.38 degrees, and a maximum image height is 14.8 mm. In a state where the extender lens unit is inserted, a maximum image height is increased to 21.64 mm.

Table 1 described below lists values in the inequalities in Numerical Example 4. Numerical Example 4 can provide a zoom lens that satisfies all the inequalities (1) to (9) and incorporates an extender lens unit that is beneficial from the aspects of a large image circle, downsizing, and high optical performance over the entire zoom range.

Fifth Exemplary Embodiment

Figure 9:
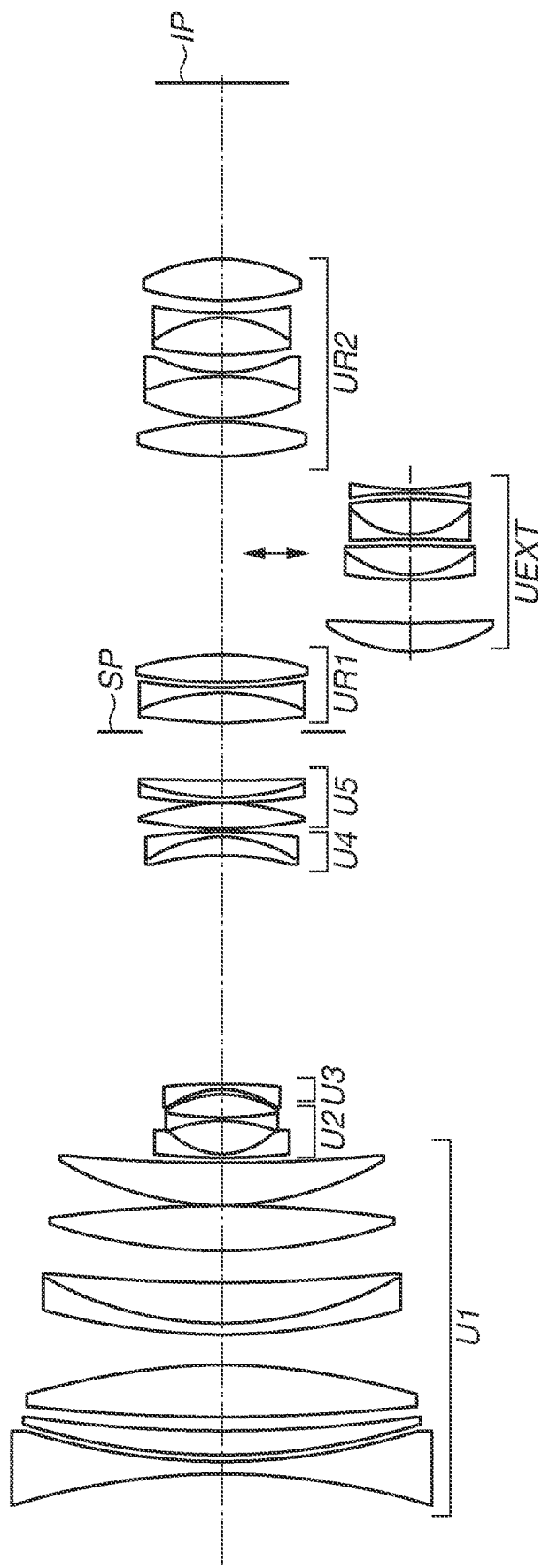
FIG. 9 is a cross-sectional diagram illustrating a zoom lens according to a fifth exemplary embodiment that is set at a wide-angle end and in a state where a focus is placed on an object at infinity.

FIG. 9 is a cross-sectional diagram illustrating a zoom lens according to the fifth exemplary embodiment that is set at a wide-angle end and in a state where a focus is placed on an object at infinity and an extender lens unit is removed. The zoom lens illustrated in FIG. 9 includes a first lens unit U1 that has positive refractive power, and does not move for zooming. A partial lens unit of the first lens unit U1 can move for focusing along an optical axis. The zoom lens further includes a second lens unit U2 (first variator) having negative refractive power. The second lens unit U2 moves (monotonously, for example) toward an image side along an optical axis for zooming from a wide-angle end to a telephoto end. The zoom lens further includes a third lens unit U3 (second variator) having negative refractive power. The third lens unit U3 moves (non-monotonously, for example) along the optical axis for the zooming. The zoom lens further includes a fourth lens unit U4 (third variator) having negative refractive power. The fourth lens unit U4 moves (non-monotonously, for example) along the optical axis for the zooming. The zoom lens further includes a fifth lens unit U5 (compensator) having positive refractive power. The fifth lens unit U5 moves (non-monotonously, for example) along the optical axis for the zooming (correction (compensation) of a variation in an image plane position that is attributed to the zooming). The zoom lens further includes an aperture stop SP. The zoom lens further includes a lens unit UR1 (front relay lens unit; R1 lens unit) that does not move for zooming. The zoom lens further includes a lens unit UR2 (rear relay lens unit; R2 lens unit) that does not move for zooming. An image plane IP corresponds to a plane on which a light receiving surface of an image pickup element (photoelectric conversion element) that receives light of an image formed by the zoom lens is arranged. The zoom lens further includes an extender lens unit UEXT (EXT lens unit) to be inserted or removed into or from an optical path between the R1 lens unit and the R2 lens unit (typically, an optical path of afocal light) for changing a focal length range of the zoom lens.

The configuration of each lens unit will now be described. Hereinafter, in each lens unit, lenses are arranged in order from an object side to an image side. The first lens unit U1 includes first to 13th surfaces, and consists of a negative lens, a positive lens, a positive lens, a cemented lens of a negative lens and a positive lens, a positive lens, and a positive lens (seven lenses). The second lens unit U2 includes 14th to 18th surfaces, and consists of a negative lens, and a cemented lens of a negative lens and a positive lens (three lenses). The third lens unit U3 includes 19th to 20th surfaces, and consists of a single positive lens. The fourth lens unit U4 includes 21st to 23rd surfaces, and consists of a cemented lens of a positive lens and a negative lens (two lenses). The fifth lens unit U5 includes 24th to 28th surfaces, and consists of a positive lens, and a cemented lens of a negative lens and a positive lens (three lenses). The lens unit UR1 includes 30th to 34th surfaces, and consists of a cemented lens of a positive lens and a negative lens, and a positive lens (three lenses). The lens unit UR2 includes 35th to 44th surfaces, and consists of a positive lens, a cemented lens of a positive lens and a negative lens, a cemented lens of a positive lens and a negative lens, and a positive lens (six lenses). The extender lens unit UEXT is insertable and removable into and from an optical path between the 34th and 35th surfaces, and consists of a positive lens, a cemented lens of a negative lens and a positive lens, a cemented lens of a negative lens and a positive lens, and a negative lens (six lenses).

Figure 10A:
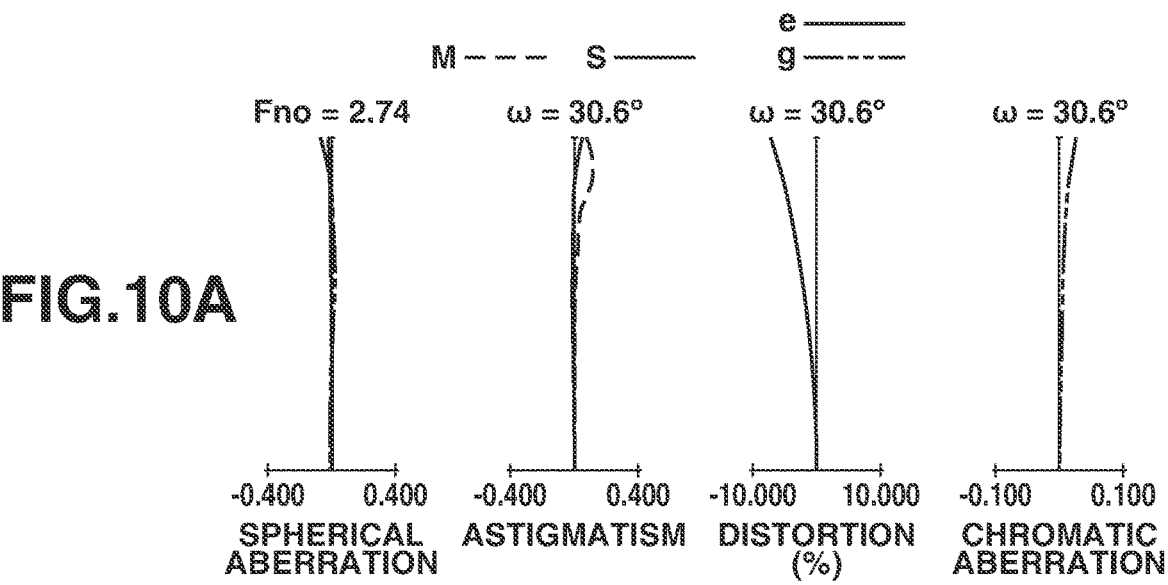
FIGS. 10A to 10F are aberration diagrams of the zoom lens according to the fifth exemplary embodiment.
Figure 10B:
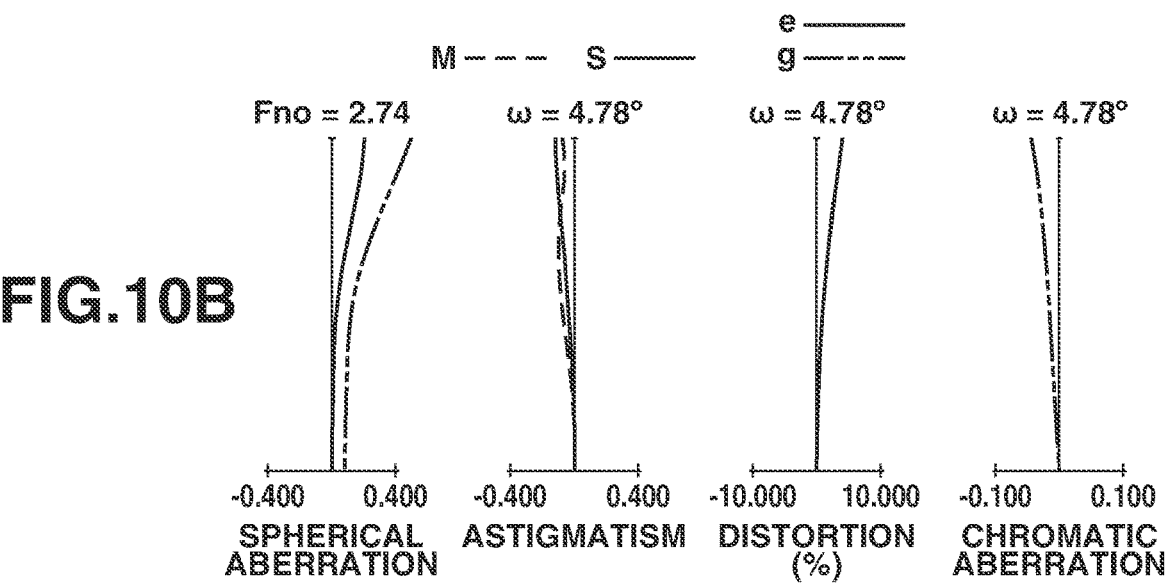
Figure 10C:
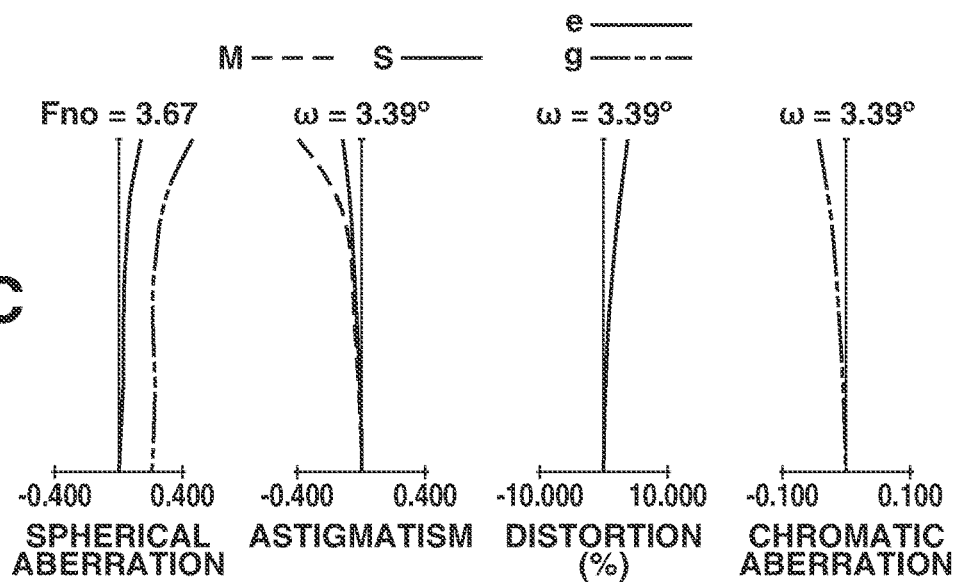
Figure 10D:
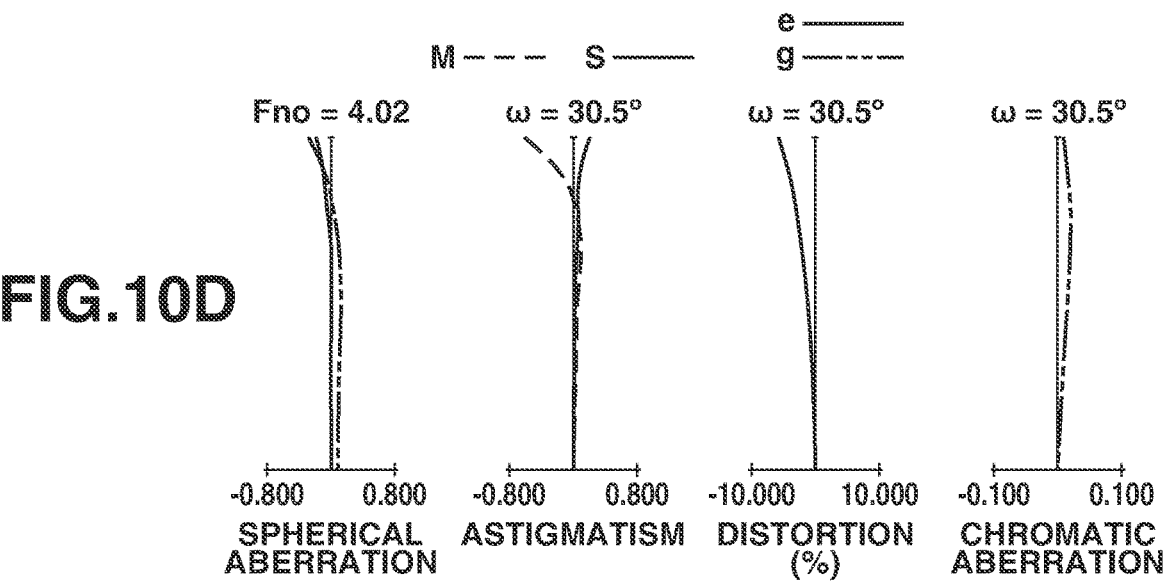
Figure 10E:
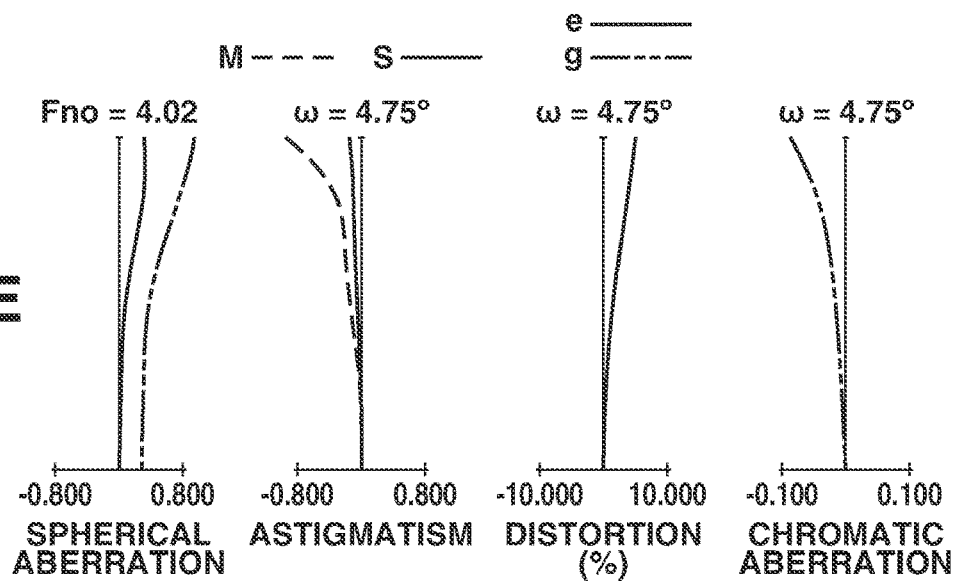
Figure 10F:
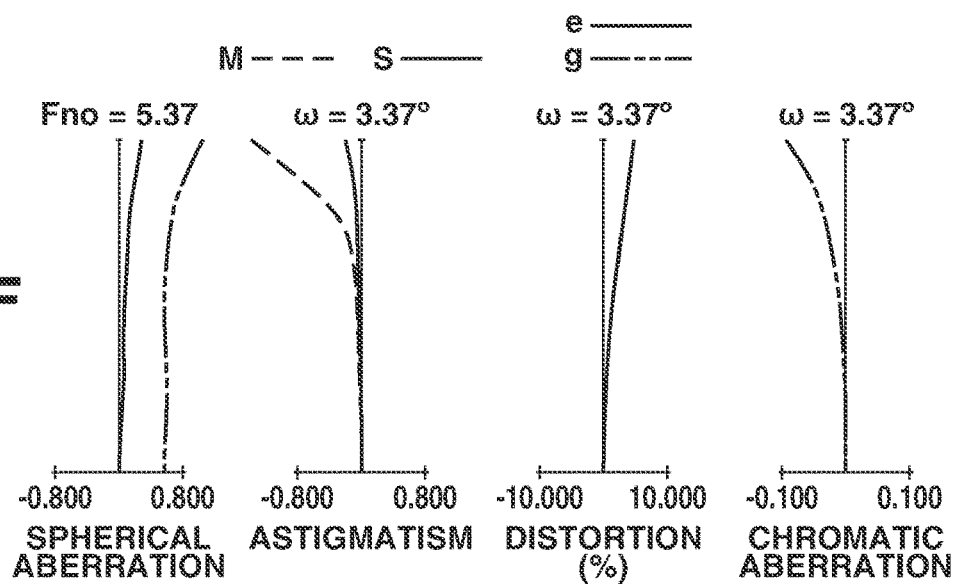

FIGS. 10A to 10F are aberration diagrams of the zoom lens according to the present exemplary embodiment (Numerical Example 5 corresponding to the present exemplary embodiment). FIGS. 10A, OB, and OC illustrate longitudinal aberrations in a state where the zoom lens is set at the wide-angle end, in a state where a focal length is 177.00 mm, and in a state where the zoom lens is set at the telephoto end, respectively, in a state where a focus is placed on an object at infinity and the extender lens unit is removed. FIGS. 10D, 10E, and 10F illustrate longitudinal aberrations in a state where the zoom lens is set at the wide-angle end, in a state where a focal length is 260.19 mm, and in a state where the zoom lens is set at the telephoto end, respectively, in a state where a focus is placed on an object at infinity and the extender lens unit is inserted.

In the present exemplary embodiment, a zoom ratio is 10.00 and magnification of the extender lens unit is 1.47. In a state where the extender lens unit is removed, a half field angle at the wide-angle end is 30.6 degrees, a half field angle at the telephoto end is 3.39 degrees, and a maximum image height is 14.8 mm. In a state where the extender lens unit is inserted, a maximum image height is increased to 21.64 mm.

Table 1 described below lists values in the inequalities in Numerical Example 5. Numerical Example 5 can provide a zoom lens that satisfies all the inequalities (1) to (9) and incorporates an extender lens unit that is beneficial from the aspects of a large image circle, downsizing, and high optical performance over the entire zoom range.

Sixth Exemplary Embodiment

Figure 11:
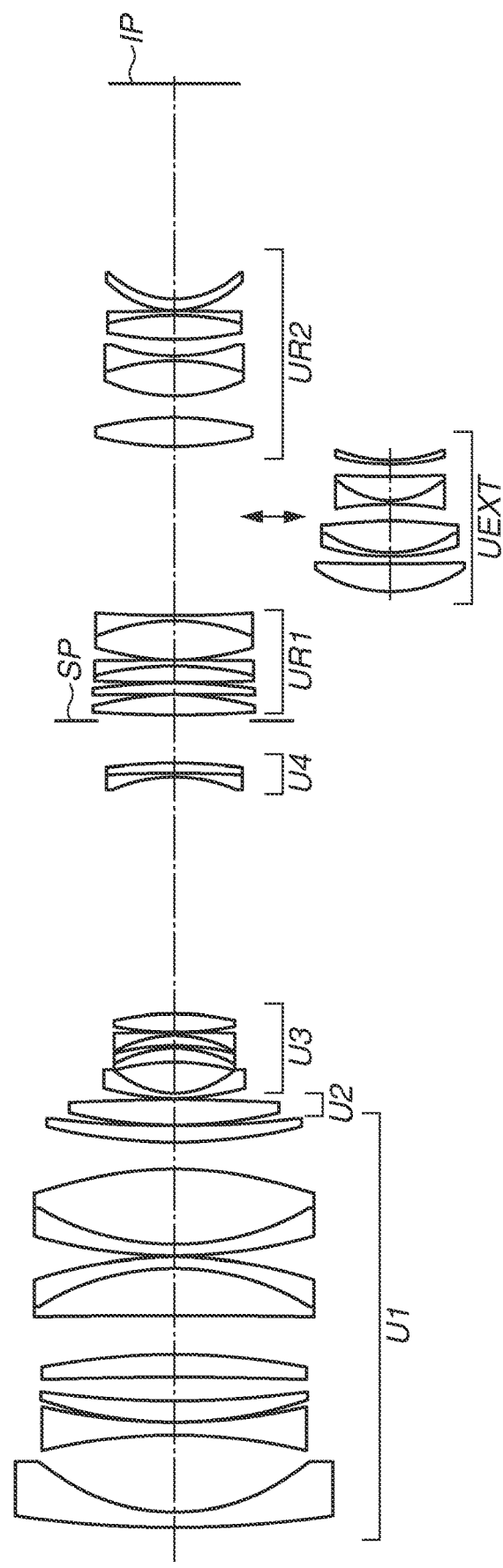
FIG. 11 is a cross-sectional diagram illustrating a zoom lens according to a sixth exemplary embodiment that is set at a wide-angle end and in a state where a focus is placed on an object at infinity.

FIG. 11 is a cross-sectional diagram illustrating a zoom lens according to the sixth exemplary embodiment that is set at a wide-angle end and in a state where a focus is placed on an object at infinity and an extender lens unit is removed. The zoom lens illustrated in FIG. 11 includes a first lens unit U1 that has positive refractive power, and does not move for zooming. A partial lens unit of the first lens unit U1 can move for focusing along an optical axis. The zoom lens further includes a second lens unit U2 (first variator) having positive refractive power. The second lens unit U2 moves (monotonously, for example) toward an image side along an optical axis for zooming from a wide-angle end to a telephoto end. The zoom lens further includes a third lens unit U3 (second variator) having negative refractive power. The third lens unit U3 moves (non-monotonously, for example) toward the image side along the optical axis for the zooming. The zoom lens further includes a fourth lens unit U4 (compensator) having positive refractive power. The fourth lens unit U4 moves (non-monotonously, for example) along the optical axis for the zooming (correction (compensation) of a variation in an image plane position that is attributed to the zooming). The zoom lens further includes an aperture stop SP. The zoom lens further includes a lens unit UR1 (front relay lens unit; R1 lens unit) that does not move for zooming. The zoom lens further includes a lens unit UR2 (rear relay lens unit; R2 lens unit) that does not move for zooming. An image plane IP corresponds to a plane on which a light receiving surface of an image pickup element (photoelectric conversion element) that receives light of an image formed by the zoom lens is arranged. The zoom lens further includes an extender lens unit UEXT (EXT lens unit) to be inserted or removed into or from an optical path between the R1 lens unit and the R2 lens unit (typically, an optical path of afocal light) for changing a focal length range of the zoom lens.

The configuration of each lens unit will now be described. Hereinafter, in each lens unit, lenses are arranged in order from an object side to an image side. The first lens unit U1 includes first to 16th surfaces, and consists of a negative lens, a negative lens, a positive lens, a positive lens, a cemented lens of a positive lens and a negative lens, a cemented lens of a negative lens and a positive lens, and a positive lens (nine lenses). The second lens unit U2 includes 17th to 18th surfaces, and consists of a single positive lens. The third lens unit U3 includes 19th to 27th surfaces, and consists of a negative lens, a cemented lens of a positive lens and a negative lens, a negative lens, and a positive lens (five lenses). The fourth lens unit U4 includes 28th to 30th surfaces, and consists of a cemented lens of a negative lens and a positive lens (two lenses). The lens unit UR1 includes 32nd to 41st surfaces, and consists of a positive lens, a positive lens, a cemented lens of a positive lens and a negative lens, and a cemented lens of a positive lens and a negative lens (six lenses). The lens unit UR2 includes 42nd to 51st surfaces, and consists of a positive lens, a cemented lens of a positive lens and a negative lens, a cemented lens of a positive lens and a negative lens, and a positive lens (six lenses). The extender lens unit UEXT is insertable and removable into and from an optical path between the 41st and 42nd surfaces, and consists of a positive lens, a cemented lens of a negative lens and a positive lens, a cemented lens of a negative lens and a positive lens, and a negative lens (six lenses).

Figure 12A:
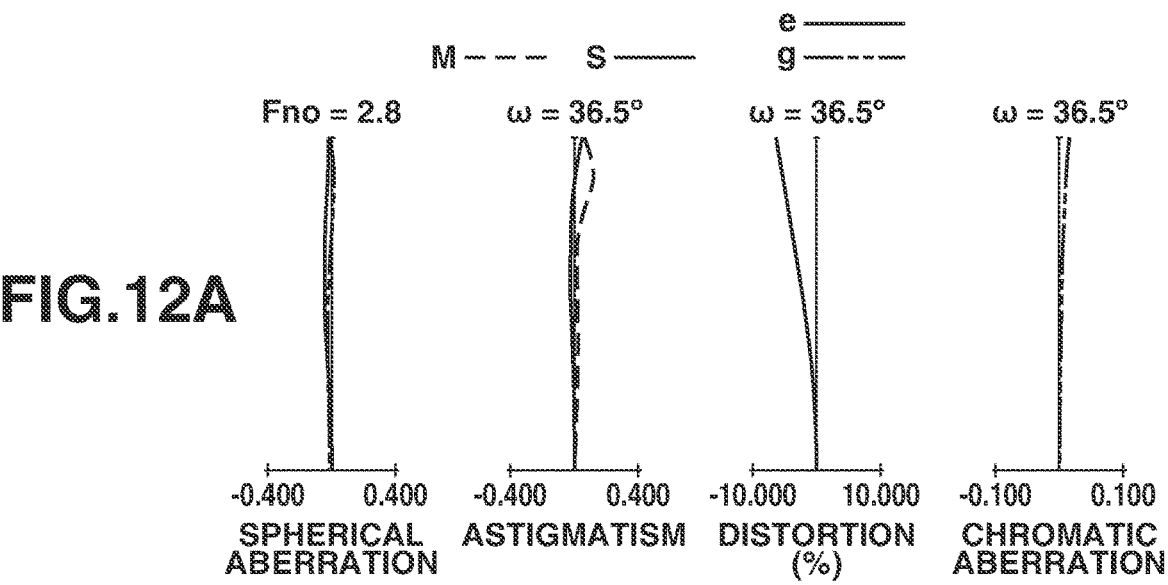
FIGS. 12A to 12F are aberration diagrams of the zoom lens according to the sixth exemplary embodiment.
Figure 12B:
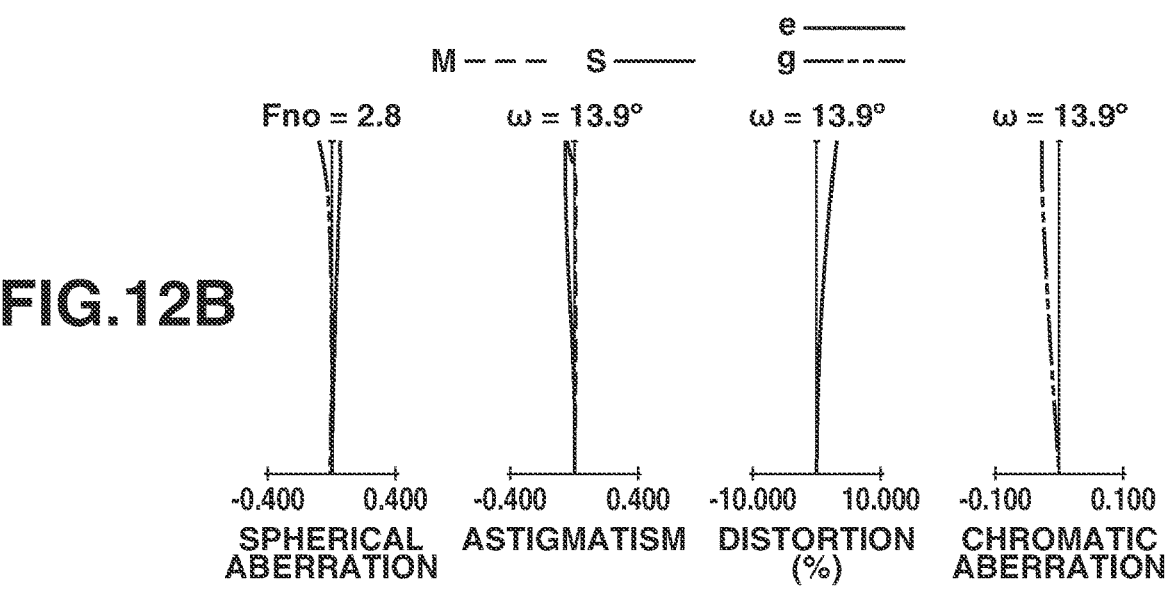
Figure 12C:
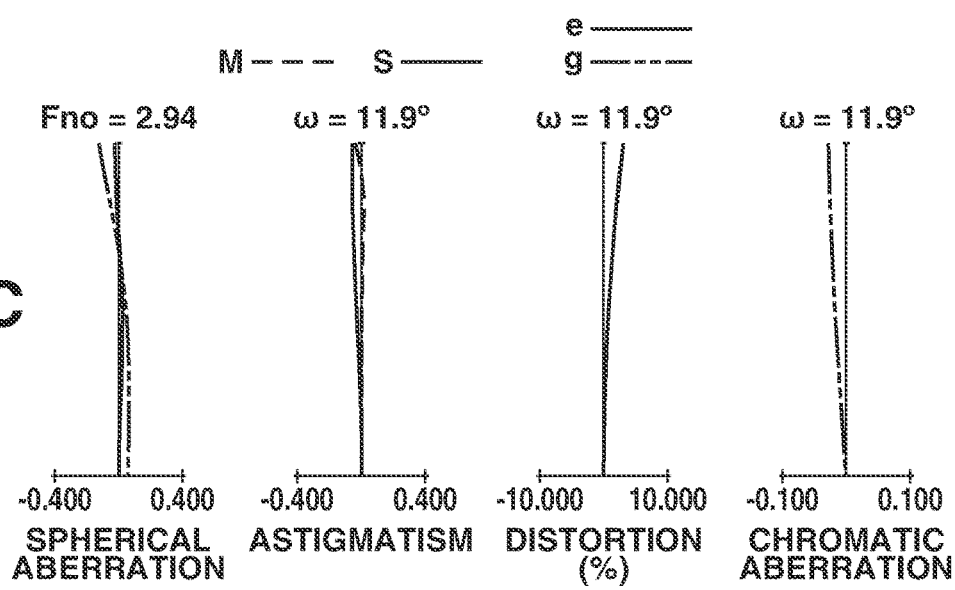
Figure 12D:
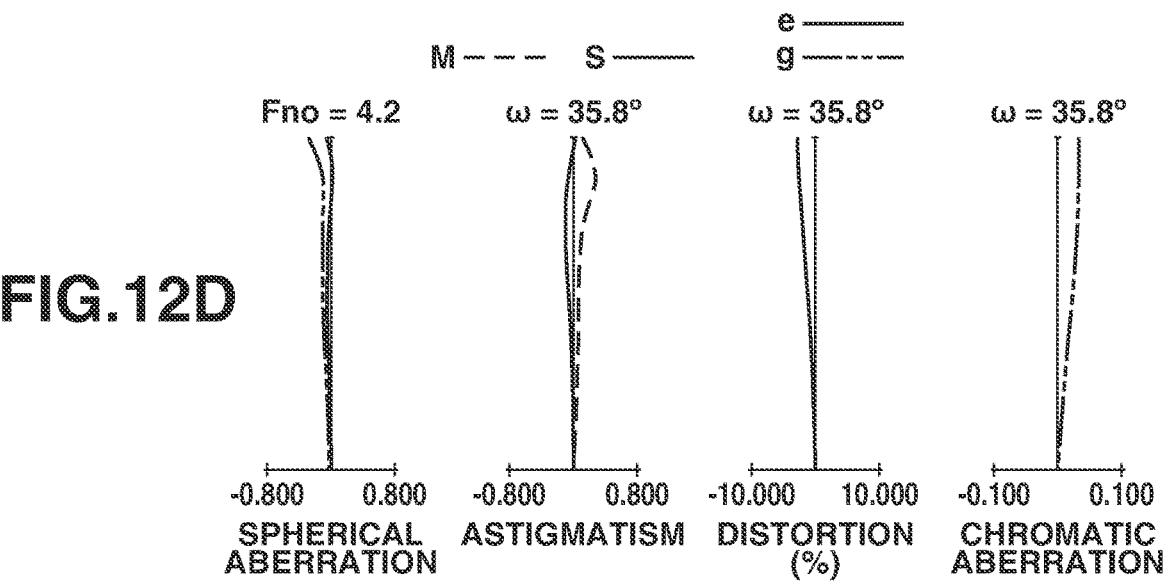
Figure 12E:
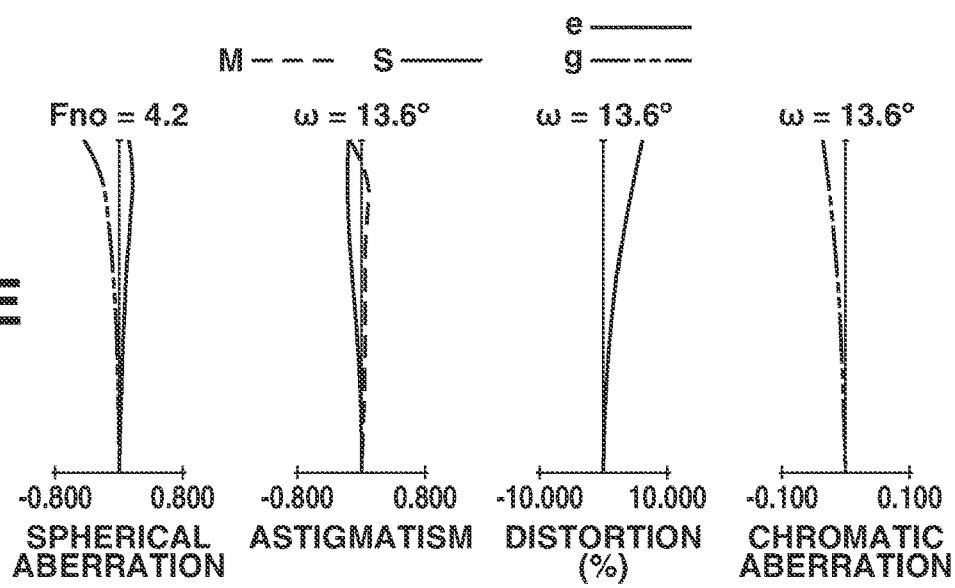
Figure 12F:
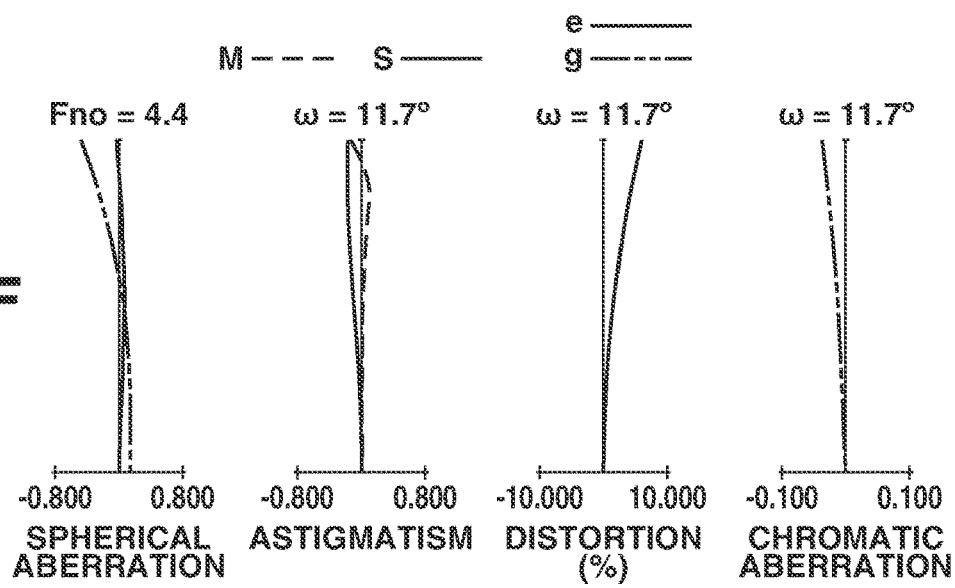

FIGS. 12A to 12F are aberration diagrams of the zoom lens according to the present exemplary embodiment (Numerical Example 6 corresponding to the present exemplary embodiment). FIGS. 12A, 12B, and 12C illustrate longitudinal aberrations in a state where the zoom lens is set at the wide-angle end, in a state where a focal length is 59.71 mm, and in a state where the zoom lens is set at the telephoto end, respectively, in a state where a focus is placed on an object at infinity and the extender lens unit is removed. FIGS. 12D, 12E, and 12F illustrate longitudinal aberrations in a state where the zoom lens is set at the wide-angle end, in a state where a focal length is 89.57 mm, and in a state where the zoom lens is set at the telephoto end, respectively, in a state where a focus is placed on an object at infinity and the extender lens unit is inserted.

In the present exemplary embodiment, a zoom ratio is 3.5 and magnification of the extender lens unit is 1.50. In a state where the extender lens unit is removed, a half field angle at the wide-angle end is 36.5 degrees, a half field angle at the telephoto end is 11.9 degrees, and a maximum image height is 14.8 mm. In a state where the extender lens unit is inserted, a maximum image height is increased to 21.64 mm.

Table 1 described below lists values in the inequalities in Numerical Example 6. Numerical Example 6 can provide a zoom lens that satisfies all the inequalities (1) to (9) and incorporates an extender lens unit that is beneficial from the aspects of a large image circle, downsizing, and high optical performance over the entire zoom range.

Exemplary Embodiment Regarding Imaging Apparatus

Figure 13:
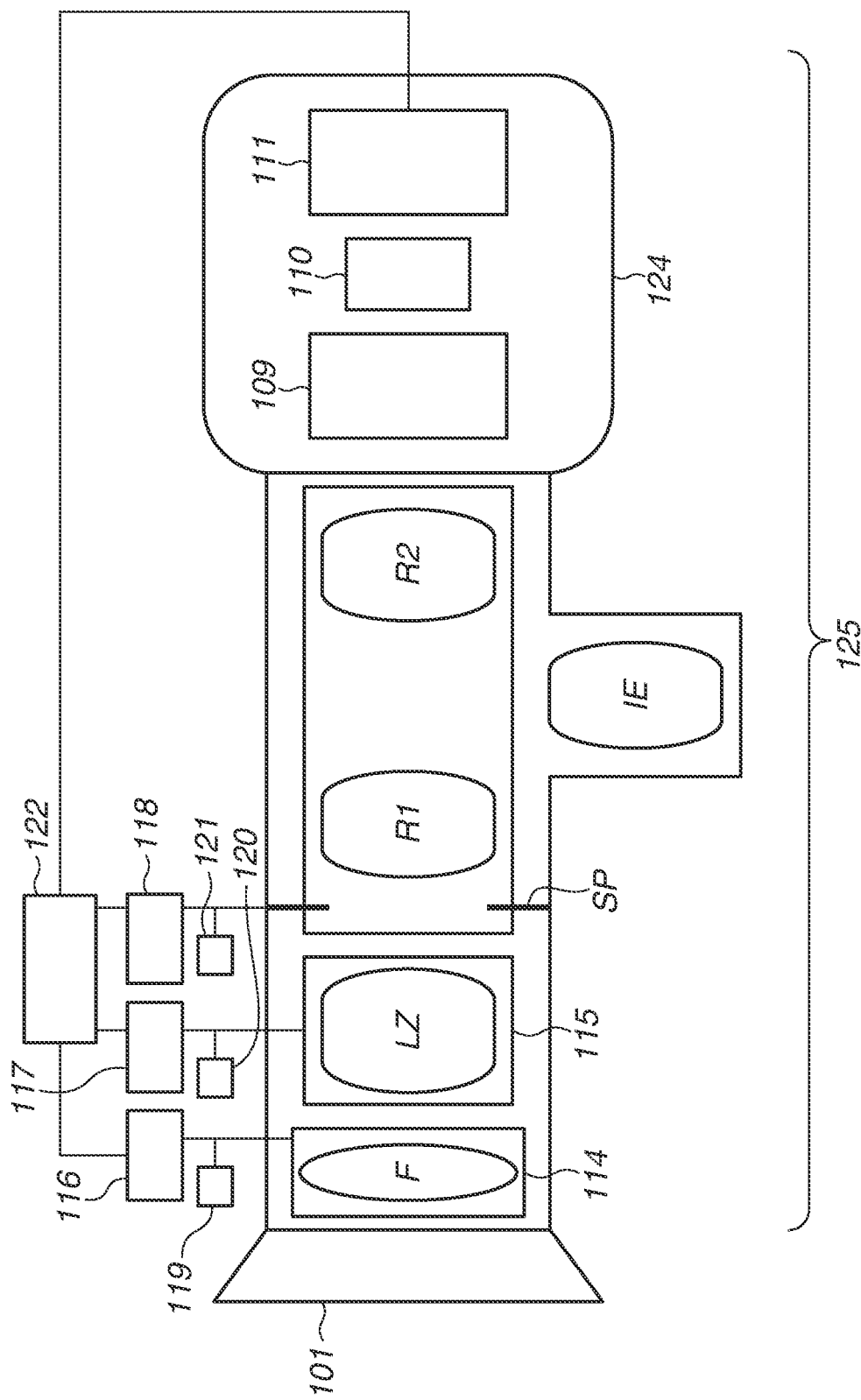
FIG. 13 is a diagram illustrating a configuration example of an imaging apparatus.

FIG. 13 is a diagram illustrating a configuration example of an imaging apparatus (e.g., television camera). In FIG. 13, a zoom lens 101 is any of the zoom lenses according to the first to sixth exemplary embodiments. The zoom lens 101 is detachable (replaceable) with respect to a camera main body (imaging apparatus main body) 124. An imaging apparatus 125 has a configuration in which the zoom lens 101 is attached to the camera main body 124. The zoom lens 101 includes a first lens unit F that does not move for zooming, a zooming lens unit LZ that moves for zooming, and relay lens units R1 and R2 for image formation. The first lens unit F includes a partial unit that moves for focusing. The zoom lens 101 includes a plurality of zooming lens units LZ that moves for zooming along trajectories different from each other, which is not illustrated in FIG. 13. On an image side of the plurality of zooming lens units LZ, an aperture stop SP, the front relay lens unit R1, and the rear relay lens unit R2 are arranged in order. The zoom lens 101 further includes an extender lens unit IE insertable and removable into and from an optical path between the front relay lens unit R1 and the rear relay lens unit R2. By the insertion and removal of the extender lens unit IE, a focal length range of the zoom lens 101 can be changed. In a state where the extender lens unit IE is inserted, an image size enlarges as compared with an image size in a state where the extender lens unit IE is removed. The zoom lens 101 accordingly enters a state suitable for being attached to a camera main body having a larger image pickup element. The imaging apparatus 125 further includes drive mechanisms 114 and 115 such as a helicoid and a cam for moving the first lens unit F and the zooming lens unit LZ, respectively, along the optical axis. Actuators (drive units) 116 to 118 drive the drive mechanisms 114 and 115 and the aperture stop SP, respectively.

Detection units 119 to 121 such as an encoder, a potentiometer, and a photosensor detect a position on the optical axis of the first lens unit F, a position on the optical axis of the zooming lens unit LZ, and a stop diameter of the aperture stop SP, respectively. The camera main body 124 includes a glass block 109 such as an optical filter or a color separation optical system, and an image pickup element (photoelectric conversion element) 110 such as a charge-coupled device (CCD) sensor or a complementary metal-oxide semiconductor (CMOS) that receives light of an image formed by the zoom lens 101. Central processing units (CPUs) (processing units) 111 and 122 respectively control each component of the camera main body 124 and each component of the zoom lens 101.

In this manner, by attaching the zoom lens according to each exemplary embodiment to a camera main body, it is possible to provide an imaging apparatus beneficial from the aspect of high image quality.

Numerical Example 1

| Unit: mm | | | | | |
|---|---|---|---|---|---|
| Surface data | | | | | |
| Surface number | r | d | nd | vd | Effective diameter |
| 1 | −167.132 | 2.80 | 1.74951 | 35.3 | 95.83 |
| 2 | 151.086 | 1.60 | | | 90.59 |
| 3 | 154.019 | 5.33 | 1.95906 | 17.5 | 90.48 |
| 4 | 330.708 | 3.62 | | | 89.93 |
| 5 | 594.579 | 11.14 | 1.60311 | 60.6 | 89.03 |
| 6* | −138.092 | 8.88 | | | 88.27 |
| 7 | 154.488 | 2.50 | 1.84666 | 23.8 | 77.97 |
| 8 | 80.966 | 9.30 | 1.43875 | 94.7 | 75.98 |
| 9 | 496.359 | 6.12 | | | 75.90 |
| 10 | 126.600 | 10.01 | 1.43387 | 95.1 | 75.72 |
| 11 | −265.687 | 0.20 | | | 75.40 |
| 12 | 67.442 | 9.49 | 1.59522 | 67.7 | 69.88 |
| 13 | 335.462 | (variable) | | | 68.94 |
| 14 | 155.823 | 0.95 | 1.75500 | 52.3 | 30.03 |
| 15 | 17.668 | 7.56 | | | 24.44 |
| 16 | −31.693 | 0.75 | 1.49700 | 81.5 | 24.31 |
| 17 | 73.352 | 5.80 | 1.80000 | 29.8 | 24.20 |
| 18 | −25.439 | 0.94 | | | 24.64 |
| 19 | −21.645 | 1.20 | 1.76385 | 48.5 | 24.51 |
| 20* | −261.202 | (variable) | | | 26.10 |
| 21 | −67.686 | 4.15 | 1.80810 | 22.8 | 22.55 |
| 22 | −32.336 | 1.10 | 1.90525 | 35.0 | 23.41 |
| 23 | −141.104 | (variable) | | | 24.28 |
| 24* | 76.972 | 7.29 | 1.64000 | 60.1 | 25.70 |
| 25 | −59.614 | 0.19 | | | 26.42 |
| 26 | 60.585 | 1.10 | 1.85478 | 24.8 | 26.29 |
| 27 | 37.997 | 5.41 | 1.48749 | 70.2 | 25.85 |
| 28 | 190.983 | (variable) | | | 25.47 |
| 29 (stop) | ∞ | 1.97 | | | 24.64 |
| 30 | 5096.847 | 3.45 | 1.48749 | 70.2 | 24.46 |
| 31 | −46.614 | 1.20 | 2.00100 | 29.1 | 24.24 |
| 32 | 179.460 | 1.40 | | | 24.53 |
| 33 | 102.958 | 4.75 | 1.72825 | 28.5 | 24.86 |
| 34 | −78.968 | 40.52 | | | 25.45 |
| 35 | 76.593 | 6.47 | 1.43875 | 94.7 | 30.34 |
| 36 | −61.617 | 1.47 | | | 30.47 |
| 37 | 48.491 | 7.44 | 1.80810 | 22.8 | 29.35 |
| 38 | −51.604 | 0.90 | 1.95375 | 32.3 | 27.77 |
| 39 | 39.215 | 6.85 | | | 26.42 |
| 40 | 46.838 | 7.89 | 1.48749 | 70.2 | 26.66 |
| 41 | −31.603 | 1.00 | 2.00100 | 29.1 | 26.04 |
| 42 | 72.647 | 1.90 | | | 27.28 |
| 43 | 51.140 | 7.10 | 1.62004 | 36.3 | 30.44 |
| 44 | −78.251 | 45.48 | | | 31.51 |
| Image plane | ∞ | | | | |

Aspherical surface data

Sixth surface

K = −1.51267e+001 A 4 = −6.49448e−007 A 6 = 2.35413e−010 A 8 = −9.02147e−014
A10 = 2.62134e−017 A12 = −3.74536e−021

20th surface

K = 3.72020e+001 A 4 = −9.83020e−006 A 6 = −4.95860e−009 A 8 = −2.35672e−011
A10 = 5.83243e−014 A12 = −2.06036e−016

24th surface

K = −1.45023e+000 A 4 = −1.99598e−006 A 6 = 6.26743e−010 A 8 = 8.22589e−013
A10 = −4.34519e−015 A12 = 5.01150e−018

Various kinds of data

| Zoom ratio | 9.62 | | | | |
|---|---|---|---|---|---|
| Focal length | 26.09 | 49.24 | 77.76 | 177.66 | 250.93 |
| F-number | 3.92 | 3.92 | 3.92 | 3.92 | 3.92 |
| Field angle | 29.56 | 16.73 | 10.78 | 4.76 | 3.38 |
| Image height | 14.80 | 14.80 | 14.80 | 14.80 | 14.80 |
| Total lens length | 309.24 | 309.24 | 309.24 | 309.24 | 309.24 |
| BF | 45.48 | 45.48 | 45.48 | 45.48 | 45.48 |
| d13 | 0.99 | 21.33 | 34.04 | 48.67 | 51.84 |

-continued

| Unit: mm | | | | | |
|---|---|---|---|---|---|
| d20 | 54.15 | 17.22 | 4.53 | 2.21 | 2.01 |
| d23 | 0.91 | 14.14 | 18.11 | 8.55 | 0.97 |
| d28 | 5.99 | 9.35 | 5.35 | 2.61 | 7.22 |
| d44 | 45.48 | 45.48 | 45.48 | 45.48 | 45.48 |
| Entrance pupil position | 72.12 | 122.92 | 185.95 | 373.75 | 476.89 |
| Exit pupil position | −97.69 | −97.69 | −97.69 | −97.69 | −97.69 |
| Front principal point position | 93.46 | 155.22 | 221.48 | 330.94 | 288.02 |
| Rear principal point position | 19.39 | −3.76 | −32.28 | −132.18 | −205.45 |

Zoom lens unit data

| Unit | Start surface | Focal length | Lens configuration Length | Front principal point position | Rear principal point position |
|---|---|---|---|---|---|
| 1 | 1 | 80.63 | 70.98 | 44.72 | −1.59 |
| 2 | 14 | −18.55 | 17.20 | 2.71 | −9.78 |
| 3 | 21 | −119.24 | 5.25 | −1.41 | −4.32 |
| 4 | 24 | 47.73 | 13.99 | 1.96 | −6.86 |
| 5 | 29 | 122.50 | 94.29 | 41.95 | −33.89 |

Extender unit

| Surface number | r | d | nd | vd | Effective diameter |
|---|---|---|---|---|---|
| 34 | −78.968 | 5.44 | | | 25.45 |
| 35ex | 30.454 | 7.17 | 1.49700 | 81.5 | 24.49 |
| 36ex | 188.145 | 0.69 | | | 22.75 |
| 37ex | 44.436 | 1.00 | 2.00100 | 29.1 | 21.95 |
| 38ex | 23.067 | 7.71 | 1.56732 | 42.8 | 20.91 |
| 39ex | −270.211 | 1.51 | | | 20.21 |
| 40ex | −188.562 | 0.88 | 1.88300 | 40.8 | 19.88 |
| 41ex | 17.945 | 7.61 | 1.72825 | 28.5 | 19.58 |
| 42ex | 672.137 | 1.50 | | | 19.76 |
| 43ex | 534.484 | 0.90 | 1.59522 | 67.7 | 19.89 |
| 44ex | 35.284 | 6.11 | | | 19.98 |

| Unit | Start surface | Focal length | Lens configuration Length | Front principal point position | Rear principal point position |
|---|---|---|---|---|---|
| ex | 35 | −327.28 | 28.97 | 158.90 | 93.36 |

Various kinds of data when extender is inserted

| Focal length | 36.39 | 68.68 | 108.46 | 247.80 | 350.00 |
|---|---|---|---|---|---|
| F-number | 5.47 | 5.47 | 5.47 | 5.47 | 5.47 |
| Field angle | 30.73 | 17.49 | 11.28 | 4.99 | 3.54 |
| Image height | 21.64 | 21.64 | 21.64 | 21.64 | 21.64 |
| Total lens length | 309.24 | 309.24 | 309.24 | 309.24 | 309.24 |
| BF | 45.48 | 45.48 | 45.48 | 45.48 | 45.48 |

Numerical Example 2

| Unit: mm | | | | | |
|---|---|---|---|---|---|
| Surface data | | | | | |
| Surface number | r | d | nd | vd | Effective diameter |
| 1 | −255.864 | 2.70 | 1.74951 | 35.3 | 92.60 |
| 2 | 124.174 | 1.26 | | | 86.38 |
| 3 | 130.004 | 5.33 | 1.95906 | 17.5 | 86.22 |
| 4 | 233.488 | 1.63 | | | 85.38 |
| 5 | 154.364 | 11.97 | 1.60311 | 60.6 | 83.63 |

-continued

| Unit: mm | | | | | |
|---|---|---|---|---|---|
| 6* | −231.218 | 9.65 | | | 82.11 |
| 7 | 172.783 | 2.40 | 1.85478 | 24.8 | 73.08 |
| 8 | 68.456 | 10.53 | 1.43875 | 94.7 | 70.62 |
| 9 | 706.175 | 5.91 | | | 70.55 |
| 10 | 94.340 | 9.64 | 1.43387 | 95.1 | 70.42 |
| 11 | −659.909 | 0.20 | | | 70.02 |
| 12 | 81.770 | 8.32 | 1.76385 | 48.5 | 67.55 |
| 13 | 675.921 | (variable) | | | 66.54 |
| 14 | 421.091 | 0.90 | 1.76385 | 48.5 | 27.23 |
| 15 | 17.178 | 6.34 | | | 22.41 |
| 16 | −43.662 | 0.75 | 1.76385 | 48.5 | 21.99 |
| 17 | 39.176 | 6.48 | 1.85478 | 24.8 | 23.22 |
| 18 | −25.174 | 1.16 | | | 23.78 |
| 19 | −20.982 | 1.00 | 1.80100 | 35.0 | 23.62 |
| 20* | −149.551 | (variable) | | | 25.21 |
| 21 | −49.610 | 1.30 | 1.89190 | 37.1 | 30.16 |
| 22 | 122.301 | 3.83 | 1.89286 | 20.4 | 32.55 |
| 23 | −157.655 | (variable) | | | 33.49 |
| 24* | 87.530 | 6.41 | 1.71300 | 53.9 | 36.69 |
| 25 | −57.432 | 0.19 | | | 37.16 |
| 26 | 47.437 | 1.10 | 1.85478 | 24.8 | 37.25 |
| 27 | 33.741 | 6.22 | 1.43875 | 94.7 | 36.27 |
| 28 | 243.056 | (variable) | | | 36.05 |
| 29 (stop) | ∞ | 1.96 | | | 35.09 |
| 30 | 410.567 | 6.95 | 1.48749 | 70.2 | 34.73 |
| 31 | −33.933 | 1.80 | 2.00100 | 29.1 | 34.46 |
| 32 | 141.001 | 4.59 | | | 35.97 |
| 33 | 121.695 | 6.79 | 1.67300 | 38.3 | 34.80 |
| 34 | −46.088 | 43.59 | | | 35.10 |
| 35 | 64.445 | 5.65 | 1.80810 | 22.8 | 38.01 |
| 36 | −290.744 | 11.42 | | | 37.55 |
| 37 | 87.826 | 6.40 | 1.56732 | 42.8 | 30.96 |
| 38 | −45.726 | 1.10 | 1.95375 | 32.3 | 29.65 |
| 39 | 41.171 | 2.43 | | | 28.23 |
| 40 | 48.759 | 10.10 | 1.43875 | 94.7 | 28.65 |
| 41 | −21.118 | 1.10 | 1.88300 | 40.8 | 28.64 |
| 42 | −148.614 | 2.17 | | | 31.32 |
| 43 | 124.421 | 10.11 | 1.43875 | 94.7 | 35.01 |
| 44 | −31.150 | 37.24 | | | 35.91 |
| Image plane ∞ | | | | | |

Aspherical surface data

Sixth surface

K = 3.82270e−001 A 4 = 1.40190e−007 A 6 = −1.13514e−011 A 8 = 6.54402e−015
A10 = −3.13083e−018 A12 = 4.10027e−022

20th surface

K = 9.73806e+001 A 4 = −7.65768e−006 A 6 = 1.94257e−010 A 8 = −1.69439e−011
A10 = 2.00669e−013 A12 = 4.14074e−017

24th surface

K = −3.64431e+000 A4 = −1.81921e−006 A6 = 1.13583e−009 A 8 = 9.03131e−013
A10 = −7.37879e−015 A12 = 1.02297e−017

Various kinds of data

| | | | | | |
|---|---|---|---|---|---|
| Zoom ratio | 9.62 | | | | |
| Focal length | 26.00 | 49.96 | 80.96 | 179.00 | 250.00 |
| F-number | 3.08 | 3.08 | 3.08 | 3.08 | 3.67 |
| Field angle | 29.65 | 16.50 | 10.36 | 4.73 | 3.39 |
| Image height | 14.80 | 14.80 | 14.80 | 14.80 | 14.80 |
| Total lens length | 313.79 | 313.79 | 313.79 | 313.79 | 313.79 |
| BF | 37.24 | 37.24 | 37.24 | 37.24 | 37.24 |
| d13 | 1.28 | 19.85 | 31.46 | 44.68 | 47.70 |
| d20 | 48.44 | 16.88 | 4.34 | 2.24 | 2.22 |
| d23 | 0.83 | 9.94 | 13.37 | 6.56 | 1.01 |
| d28 | 4.60 | 8.48 | 5.98 | 1.67 | 4.22 |
| d44 | 37.24 | 37.24 | 37.24 | 37.24 | 37.24 |
| Entrance pupil position | 74.16 | 125.22 | 188.64 | 374.32 | 477.49 |
| Exit pupil position | −181.01 | −181.01 | −181.01 | −181.01 | −181.01 |

| Unit: mm | | | | | |
|---|---|---|---|---|---|
| Front principal point position | 97.06 | 163.74 | 239.57 | 406.52 | 441.12 |
| Rear principal point position | 11.25 | -12.71 | -43.72 | -141.76 | -212.76 |

Zoom lens unit data

| Unit | Start surface | Focal length | Lens configuration Length | Front principal point position | Rear principal point position |
|---|---|---|---|---|---|
| 1 | 1 | 77.00 | 69.55 | 43.06 | -5.02 |
| 2 | 14 | -16.58 | 16.63 | 2.29 | -9.34 |
| 3 | 21 | -83.06 | 5.13 | -1.29 | -4.05 |
| 4 | 24 | 40.81 | 13.93 | 1.91 | -6.90 |
| 5 | 29 | 107.49 | 116.17 | 61.70 | -36.20 |

Extender unit

| Surface number | r | d | nd | vd | Effective diameter |
|---|---|---|---|---|---|
| 34 | -46.088 | 5.31 | | | 35.10 |
| 35ex | 29.017 | 7.50 | 1.59522 | 67.7 | 37.26 |
| 36ex | 137.356 | 3.61 | | | 35.95 |
| 37ex | 49.019 | 1.00 | 2.00100 | 29.1 | 31.10 |
| 38ex | 20.799 | 8.33 | 1.54814 | 45.8 | 28.37 |
| 39ex | -134.668 | 1.50 | | | 27.65 |
| 40ex | -84.362 | 0.88 | 1.88300 | 40.8 | 26.87 |
| 41ex | 15.978 | 9.90 | 1.74077 | 27.8 | 25.31 |
| 42ex | -48.442 | 1.52 | | | 25.30 |
| 43ex | -37.333 | 0.90 | 1.61800 | 63.3 | 24.83 |
| 44ex | 42.405 | 3.13 | | | 24.90 |

| Unit | Start surface | Focal length | Lens configuration Length | Front principal point position | Rear principal point position |
|---|---|---|---|---|---|
| ex | 35 | -205.09 | 35.14 | 148.81 | 71.22 |

Various kinds of data when extender is inserted

| Focal length | 40.81 | 78.43 | 127.11 | 281.03 | 392.50 |
|---|---|---|---|---|---|
| F-number | 4.84 | 4.84 | 4.84 | 4.84 | 5.76 |
| Field angle | 29.62 | 16.48 | 10.34 | 4.72 | 3.38 |
| Image height | 23.20 | 23.20 | 23.20 | 23.20 | 23.20 |
| Total lens length | 313.79 | 313.79 | 313.79 | 313.79 | 313.79 |
| BF | 37.24 | 37.24 | 37.24 | 37.24 | 37.24 |

Numerical Example 3

| Unit: mm | | | | | |
|---|---|---|---|---|---|

Surface data

| Surface number | r | d | nd | vd | Effective diameter |
|---|---|---|---|---|---|
| 1 | 303.002 | 3.20 | 1.77250 | 49.6 | 93.82 |
| 2 | 55.228 | 24.25 | | | 78.60 |
| 3 | -109.283 | 2.70 | 1.77250 | 49.6 | 78.45 |
| 4 | -949.635 | 0.20 | | | 80.10 |
| 5 | 120.281 | 5.64 | 1.92286 | 20.9 | 82.23 |
| 6 | 250.546 | 2.00 | | | 81.85 |
| 7 | 217.047 | 12.08 | 1.62041 | 60.3 | 81.56 |
| 8* | -138.331 | 5.92 | | | 81.00 |
| 9 | 1402.427 | 9.79 | 1.49700 | 81.5 | 76.42 |
| 10 | -98.925 | 2.50 | 1.80000 | 29.8 | 76.09 |
| 11 | -265.350 | 0.20 | | | 75.97 |
| 12 | 149.654 | 2.50 | 1.73800 | 32.3 | 74.62 |
| 13 | 55.521 | 16.88 | 1.49700 | 81.5 | 72.13 |

-continued

| | | Unit: mm | | | |
|---|---|---|---|---|---|
| 14 | −472.637 | 2.14 | | | 72.14 |
| 15 | 129.099 | 10.70 | 1.53775 | 74.7 | 71.58 |
| 16 | −169.638 | 0.20 | | | 71.12 |
| 17 | 81.356 | 6.42 | 1.76385 | 48.5 | 64.24 |
| 18 | 200.443 | (variable) | | | 62.56 |
| 19* | 52.241 | 1.20 | 1.88300 | 40.8 | 30.37 |
| 20 | 18.862 | 4.87 | | | 25.51 |
| 21 | 170.420 | 4.31 | 1.84666 | 23.8 | 25.21 |
| 22 | −33.527 | 0.70 | 1.77250 | 49.6 | 24.46 |
| 23 | 72.187 | 4.00 | | | 22.30 |
| 24 | −24.222 | 0.70 | 1.72916 | 54.7 | 21.90 |
| 25 | 432.864 | 0.16 | | | 22.92 |
| 26 | 67.073 | 4.00 | 1.65412 | 39.7 | 23.88 |
| 27 | −59.181 | (variable) | | | 24.43 |
| 28 | −35.290 | 0.90 | 1.65160 | 58.5 | 24.94 |
| 29 | 116.270 | 2.49 | 1.80810 | 22.8 | 26.77 |
| 30 | −575.295 | (variable) | | | 27.38 |
| 31 (stop) | ∞ | 1.30 | | | 33.26 |
| 32 | 301.771 | 4.29 | 1.88300 | 40.8 | 34.53 |
| 33 | −67.262 | 0.20 | | | 34.97 |
| 34 | 109.597 | 3.96 | 1.61800 | 63.3 | 35.34 |
| 35 | −150.077 | 0.20 | | | 35.24 |
| 36 | 57.148 | 6.62 | 1.49700 | 81.5 | 34.24 |
| 37 | −59.469 | 1.20 | 2.00100 | 29.1 | 33.64 |
| 38 | 223.233 | 0.20 | | | 33.12 |
| 39 | 48.443 | 4.59 | 1.69895 | 30.1 | 32.88 |
| 40 | 487.377 | 1.10 | 2.00100 | 29.1 | 32.19 |
| 41 | 57.601 | 38.00 | | | 31.28 |
| 42 | 60.027 | 5.35 | 1.69350 | 50.8 | 31.95 |
| 43 | −76.297 | 4.48 | | | 31.86 |
| 44 | 34.496 | 6.61 | 1.43875 | 94.7 | 28.01 |
| 45 | −47.000 | 1.00 | 2.00069 | 25.5 | 27.10 |
| 46 | 34.733 | 1.49 | | | 25.98 |
| 47 | 55.901 | 8.03 | 1.80810 | 22.8 | 26.20 |
| 48 | −23.568 | 1.00 | 1.88300 | 40.8 | 26.22 |
| 49 | 50.832 | 0.20 | | | 26.61 |
| 50 | 33.376 | 5.58 | 1.43875 | 94.7 | 27.52 |
| 51 | −89.349 | 45.42 | | | 27.71 |
| Image plane ∞ | | | | | |

Aspherical surface data

Eighth surface

K = 6.33538e−001 A 4 = 2.13961e−007 A 6 = 2.49684e−011 A 8 = −1.21667e−013
A10 = 2.02965e−016 A12 = −1.87004e−019 A14 = 8.67842e−023 A16 = −1.59245e−026

19th surface

K = 1.60063e+000 A 4 = −3.65682e−007 A 6 = −5.37872e−009 A 8 = −6.29839e−012
A10 = 2.76307e−013 A12 = −2.46779e−015 A14 = 8.97129e−018 A16 = −1.21330e−020

Various kinds of data

| | | | | | |
|---|---|---|---|---|---|
| Zoom ratio | 8.00 | | | | |
| Focal length | 19.31 | 38.62 | 67.58 | 106.20 | 154.47 |
| F-number | 2.80 | 2.80 | 2.80 | 2.80 | 3.52 |
| Field angle | 37.47 | 20.97 | 12.35 | 7.93 | 5.47 |
| Image height | 14.80 | 14.80 | 14.80 | 14.80 | 14.80 |
| Total lens length | 323.02 | 323.02 | 323.02 | 323.02 | 323.02 |
| BF | 45.42 | 45.42 | 45.42 | 45.42 | 45.42 |
| d18 | 0.39 | 21.49 | 33.49 | 40.61 | 44.85 |
| d27 | 41.79 | 17.03 | 5.40 | 2.82 | 5.82 |
| d30 | 9.40 | 13.05 | 12.69 | 8.15 | 0.90 |
| d51 | 45.42 | 45.42 | 45.42 | 45.42 | 45.42 |
| Entrance pupil position | 60.65 | 89.11 | 122.20 | 157.65 | 191.30 |
| Exit pupil position | −88.92 | −88.92 | −88.92 | −88.92 | −88.92 |
| Front principal point position | 77.18 | 116.62 | 155.78 | 179.90 | 168.16 |
| Rear principal point position | 26.11 | 6.80 | −22.16 | −60.78 | −109.05 |

-continued

| Unit: mm | | | | | |
|---|---|---|---|---|---|
| Zoom lens unit data | | | | | |
| Unit | Start surface | Focal length | Lens configuration Length | Front principal point position | Rear principal point position |
| 1 | 1 | 53.26 | 107.32 | 61.61 | 20.95 |
| 2 | 19 | −21.69 | 19.93 | 3.46 | −11.43 |
| 3 | 28 | −63.84 | 3.39 | −0.22 | −2.14 |
| 4 | 31 | 39.82 | 95.38 | 13.02 | −69.57 |

| Extender unit | | | | | |
|---|---|---|---|---|---|
| Surface number | r | d | nd | vd | Effective diameter |
| 41 | 57.601 | 5.55 | | | 31.28 |
| 42ex | 24.501 | 7.63 | 1.53775 | 74.7 | 32.03 |
| 43ex | 395.440 | 1.50 | | | 30.86 |
| 44ex | 37.791 | 1.00 | 2.00100 | 29.1 | 27.42 |
| 45ex | 18.103 | 8.08 | 1.54814 | 45.8 | 24.66 |
| 46ex | −61.893 | 1.62 | | | 23.39 |
| 47ex | −40.093 | 0.88 | 1.88300 | 40.8 | 21.67 |
| 48ex | 14.722 | 6.52 | 1.72825 | 28.5 | 20.14 |
| 49ex | −113.027 | 2.14 | | | 20.32 |
| 50ex | −180.176 | 0.90 | 1.58913 | 61.1 | 20.37 |
| 51ex | 32.423 | 2.17 | | | 20.5 |

| Unit | Start surface | Focal length | Lens configuration Length | Front principal point position | Rear principal point position |
|---|---|---|---|---|---|
| ex | 42 | −517.65 | 30.28 | 366.50 | 201.35 |

| Various kinds of data when extender is inserted | | | | | |
|---|---|---|---|---|---|
| Focal length | 32.00 | 64.00 | 112.00 | 176.00 | 256.00 |
| F-number | 4.64 | 4.64 | 4.64 | 4.64 | 5.84 |
| Field angle | 34.06 | 18.68 | 10.93 | 7.01 | 4.83 |
| Image height | 21.64 | 21.64 | 21.64 | 21.64 | 21.64 |
| Total lens length | 323.02 | 323.02 | 323.02 | 323.02 | 323.02 |
| BF | 45.42 | 45.42 | 45.42 | 45.42 | 45.42 |

Numerical Example 4

| Unit: mm | | | | | |
|---|---|---|---|---|---|
| Surface data | | | | | |
| Surface number | r | d | nd | vd | Effective diameter |
| 1 | −167.132 | 2.80 | 1.74951 | 35.3 | 95.83 |
| 2 | 151.086 | 1.60 | | | 90.59 |
| 3 | 154.019 | 5.33 | 1.95906 | 17.5 | 90.48 |
| 4 | 330.708 | 3.62 | | | 89.93 |
| 5 | 594.579 | 11.14 | 1.60311 | 60.6 | 89.03 |
| 6* | −138.092 | 8.88 | | | 88.27 |
| 7 | 154.488 | 2.50 | 1.84666 | 23.8 | 77.97 |
| 8 | 80.966 | 9.30 | 1.43875 | 94.7 | 75.98 |
| 9 | 496.359 | 6.12 | | | 75.90 |
| 10 | 126.600 | 10.01 | 1.43387 | 95.1 | 75.72 |
| 11 | −265.687 | 0.20 | | | 75.40 |
| 12 | 67.442 | 9.49 | 1.59522 | 67.7 | 69.88 |
| 13 | 335.462 | (variable) | | | 68.94 |
| 14 | 155.823 | 0.95 | 1.75500 | 52.3 | 30.03 |
| 15 | 17.668 | 7.56 | | | 24.44 |
| 16 | −31.693 | 0.75 | 1.49700 | 81.5 | 24.31 |
| 17 | 73.352 | 5.80 | 1.80000 | 29.8 | 24.20 |
| 18 | −25.439 | 0.94 | | | 24.64 |
| 19 | −21.645 | 1.20 | 1.76385 | 48.5 | 24.51 |

-continued

| Unit: mm | | | | | |
|---|---|---|---|---|---|
| 20* | −261.202 | (variable) | | | 26.10 |
| 21 | −67.686 | 4.15 | 1.80810 | 22.8 | 31.60 |
| 22 | −32.336 | 1.10 | 1.90525 | 35.0 | 32.31 |
| 23 | −141.104 | (variable) | | | 34.28 |
| 24* | 76.972 | 7.29 | 1.64000 | 60.1 | 37.33 |
| 25 | −59.614 | 0.19 | | | 37.81 |
| 26 | 60.585 | 1.10 | 1.85478 | 24.8 | 37.41 |
| 27 | 37.997 | 5.41 | 1.48749 | 70.2 | 36.48 |
| 28 | 190.983 | (variable) | | | 36.24 |
| 29 (stop) | ∞ | 1.93 | | | 35.14 |
| 30 | 4778.038 | 5.17 | 1.48749 | 70.2 | 34.87 |
| 31 | −47.124 | 1.20 | 2.00100 | 29.1 | 34.71 |
| 32 | 172.264 | 0.68 | | | 35.41 |
| 33 | 102.513 | 8.79 | 1.72825 | 28.5 | 36.16 |
| 34 | −80.224 | 37.30 | | | 36.36 |
| 35 | 82.296 | 8.03 | 1.43875 | 94.7 | 37.45 |
| 36 | −62.461 | 2.21 | | | 37.37 |
| 37 | 54.191 | 8.49 | 1.80810 | 22.8 | 35.02 |
| 38 | −49.437 | 0.90 | 1.95375 | 32.3 | 33.69 |
| 39 | 45.139 | 6.45 | | | 31.05 |
| 40 | 44.839 | 8.91 | 1.48749 | 70.2 | 30.51 |
| 41 | −32.737 | 1.00 | 2.00100 | 29.1 | 29.73 |
| 42 | 61.768 | 1.88 | | | 30.09 |
| 43 | 48.657 | 7.42 | 1.62004 | 36.3 | 31.86 |
| 44 | −80.851 | 43.74 | | | 32.23 |
| Image plane ∞ | | | | | |

Aspherical surface data

Sixth surface

K = −1.51267e+001 A 4 = −6.49448e−007 A 6 = 2.35413e−010 A 8 = −9.02147e−014
A10 = 2.62134e−017 A12 = −3.74536e−021

20th surface

K = 3.72020e+001 A 4 = −9.83020e−006 A 6 = −4.95860e−009 A 8 = −2.35672e−011
A10 = 5.83243e−014 A12 = −2.06036e−016

24th surface

K = −1.45023e+000 A 4 = −1.99598e−006 A 6 = 6.26743e−010 A 8 = 8.22589e−013
A10 = −4.34519e−015 A12 = 5.01150e−018

Various kinds of data

| | | | | | |
|---|---|---|---|---|---|
| Zoom ratio | 9.62 | | | | |
| Focal length | 26.09 | 49.24 | 77.76 | 177.67 | 250.94 |
| F-number | 2.77 | 2.78 | 2.77 | 2.77 | 3.68 |
| Field angle | 29.56 | 16.73 | 10.78 | 4.76 | 3.38 |
| Image height | 14.80 | 14.80 | 14.80 | 14.80 | 14.80 |
| Total lens length | 313.57 | 313.57 | 313.57 | 313.57 | 313.57 |
| BF | 43.74 | 43.74 | 43.74 | 43.74 | 43.74 |
| d13 | 0.99 | 21.33 | 34.04 | 48.67 | 51.84 |
| d20 | 54.15 | 17.22 | 4.53 | 2.21 | 2.01 |
| d23 | 0.91 | 14.14 | 18.11 | 8.55 | 0.97 |
| d28 | 5.99 | 9.35 | 5.35 | 2.61 | 7.22 |
| d44 | 43.74 | 43.74 | 43.74 | 43.74 | 43.74 |
| Entrance pupil position | 72.12 | 122.92 | 185.95 | 373.75 | 476.89 |
| Exit pupil position | −95.27 | −95.27 | −95.27 | −95.27 | −95.27 |
| Front principal point position | 93.32 | 154.71 | 220.21 | 324.33 | 274.82 |
| Rear principal point position | 17.64 | −5.51 | −34.03 | −133.93 | −207.20 |

Zoom lens unit data

| Unit | Start surface | Focal length | Lens configuration Length | Front principal point position | Rear principal point position |
|---|---|---|---|---|---|
| 1 | 1 | 80.63 | 70.98 | 44.72 | −1.59 |
| 2 | 14 | −18.55 | 17.20 | 2.71 | −9.78 |
| 3 | 21 | −119.24 | 5.25 | −1.41 | −4.32 |

Unit: mm

| 4 | 24 | 47.73 | 13.99 | 1.96 | −6.86 |
| 5 | 29 | 123.62 | 100.37 | 39.90 | −36.36 |

Extender unit

| Surface number | r | d | nd | vd | Effective diameter |
|---|---|---|---|---|---|
| 34 | −80.224 | 1.44 | | | 36.36 |
| 35ex | 30.322 | 6.93 | 1.49700 | 81.5 | 35.60 |
| 36ex | 187.430 | 0.50 | | | 34.55 |
| 37ex | 44.236 | 1.00 | 2.00100 | 29.1 | 32.51 |
| 38ex | 23.294 | 7.86 | 1.56732 | 42.8 | 29.96 |
| 39ex | −279.109 | 1.69 | | | 28.87 |
| 40ex | −180.870 | 0.88 | 1.88300 | 40.8 | 27.34 |
| 41ex | 18.159 | 6.79 | 1.72825 | 28.5 | 24.83 |
| 42ex | 635.002 | 1.50 | | | 24.63 |
| 43ex | 538.899 | 0.90 | 1.59522 | 67.7 | 24.59 |
| 44ex | 35.563 | 7.83 | | | 24.48 |

| Unit | Start surface | Focal length | Lens configuration Length | Front principal point position | Rear principal point position |
|---|---|---|---|---|---|
| ex | 35 | −359.96 | 28.04 | 170.79 | 102.54 |

Various kinds of data when extender is inserted

| Focal length | 36.39 | 68.68 | 108.46 | 247.80 | 349.99 |
| F-number | 3.87 | 3.87 | 3.87 | 3.87 | 5.14 |
| Field angle | 30.73 | 17.49 | 11.28 | 4.99 | 3.54 |
| Image height | 21.64 | 21.64 | 21.64 | 21.64 | 21.64 |
| Total lens length | 313.57 | 313.57 | 313.57 | 313.57 | 313.57 |
| BF | 43.74 | 43.74 | 43.74 | 43.74 | 43.74 |

Numerical Example 5

Unit: mm

Surface data

| Surface number | r | d | nd | vd | Effective diameter |
|---|---|---|---|---|---|
| 1 | −157.450 | 2.80 | 1.74951 | 35.3 | 90.50 |
| 2 | 146.589 | 1.51 | | | 85.55 |
| 3 | 148.972 | 5.22 | 1.95906 | 17.5 | 85.42 |
| 4 | 304.629 | 3.22 | | | 84.76 |
| 5 | 440.197 | 11.46 | 1.60311 | 60.6 | 83.87 |
| 6* | −137.797 | 6.74 | | | 83.01 |
| 7 | 145.621 | 2.50 | 1.84666 | 23.8 | 78.20 |
| 8 | 79.991 | 9.08 | 1.43875 | 94.7 | 75.68 |
| 9 | 366.639 | 6.92 | | | 75.39 |
| 10 | 125.432 | 9.93 | 1.43387 | 95.1 | 75.17 |
| 11 | −285.452 | 0.20 | | | 74.86 |
| 12 | 70.563 | 9.55 | 1.59522 | 67.7 | 70.61 |
| 13 | 398.520 | (variable) | | | 69.65 |
| 14 | 121.039 | 0.95 | 1.75500 | 52.3 | 28.84 |
| 15 | 16.708 | 7.42 | | | 23.53 |
| 16 | −31.712 | 0.75 | 1.43875 | 94.9 | 23.35 |
| 17 | 80.329 | 5.00 | 1.80000 | 29.8 | 23.61 |
| 18 | −26.138 | (variable) | | | 23.94 |
| 19 | −21.573 | 1.20 | 1.77250 | 49.6 | 23.60 |
| 20* | −474.767 | (variable) | | | 25.15 |
| 21 | −59.822 | 4.14 | 1.80810 | 22.8 | 30.31 |
| 22 | −29.484 | 1.10 | 1.90525 | 35.0 | 31.05 |
| 23 | −128.970 | (variable) | | | 33.18 |
| 24* | 83.013 | 5.68 | 1.65160 | 58.5 | 35.49 |
| 25 | −54.281 | 0.18 | | | 35.75 |
| 26 | 123.375 | 1.10 | 1.85478 | 24.8 | 35.64 |
| 27 | 57.357 | 3.86 | 1.48749 | 70.2 | 35.26 |
| 28 | 510.997 | (variable) | | | 35.23 |

| Unit: mm | | | | | |
|---|---|---|---|---|---|
| 29 (stop) | ∞ | 1.97 | | | 35.21 |
| 30 | 120.515 | 6.66 | 1.48749 | 70.2 | 35.20 |
| 31 | −45.964 | 1.20 | 2.00100 | 29.1 | 35.02 |
| 32 | 133.866 | 1.03 | | | 35.84 |
| 33 | 100.894 | 6.29 | 1.74000 | 28.3 | 36.72 |
| 34 | −62.800 | 43.83 | | | 37.01 |
| 35 | 67.027 | 7.73 | 1.43875 | 94.7 | 36.38 |
| 36 | −68.334 | 0.76 | | | 36.12 |
| 37 | 41.831 | 9.32 | 1.80810 | 22.8 | 33.48 |
| 38 | −50.458 | 0.90 | 2.00100 | 29.1 | 31.49 |
| 39 | 33.919 | 3.94 | | | 28.46 |
| 40 | 70.930 | 8.27 | 1.48749 | 70.2 | 28.42 |
| 41 | −25.391 | 1.00 | 2.00100 | 29.1 | 28.03 |
| 42 | 85.803 | 3.04 | | | 29.53 |
| 43 | 68.284 | 8.80 | 1.62004 | 36.3 | 33.03 |
| 44 | −38.769 | 39.45 | | | 33.91 |
| Image plane | ∞ | | | | |

Aspherical surface data

Sixth surface

K = −1.72314e+001 A 4 = −7.41495e−007 A 6 = 3.15111e−010 A 8 = −1.37097e−013
A10 = 4.45519e−017 A12 = −6.96328e−021

20th surface

K = 4.78250e+002 A 4 = −1.21000e−005 A 6 = −8.07839e−009 A 8 = 6.42059e−012
A10 = −1.61016e−013 A12 = 1.15068e−016

24th surface

K = −2.02310e+000 A 4 = −2.41039e−006 A 6 = 7.84195e−010 A 8 = 1.96909e−012
A10 = −8.08416e−015 A12 = 8.96748e−018

Various kinds of data

| | | | | | |
|---|---|---|---|---|---|
| Zoom ratio | 10.00 | | | | |
| Focal length | 25.00 | 46.91 | 75.75 | 177.00 | 249.99 |
| F-number | 2.74 | 2.73 | 2.73 | 2.74 | 3.67 |
| Field angle | 30.63 | 17.51 | 11.06 | 4.78 | 3.39 |
| Image height | 14.80 | 14.80 | 14.80 | 14.80 | 14.80 |
| Total lens length | 309.08 | 309.08 | 309.08 | 309.08 | 309.08 |
| BF | 39.45 | 39.45 | 39.45 | 39.45 | 39.45 |
| d13 | 0.97 | 22.43 | 35.84 | 51.20 | 54.61 |
| d18 | 1.15 | 1.32 | 1.29 | 1.57 | 1.67 |
| d20 | 50.86 | 16.66 | 4.72 | 2.51 | 2.30 |
| d23 | 0.62 | 12.41 | 15.98 | 7.69 | 0.95 |
| d28 | 10.77 | 11.56 | 6.55 | 1.39 | 4.84 |
| d44 | 39.45 | 39.45 | 39.45 | 39.45 | 39.45 |
| Entrance pupil position | 69.43 | 121.30 | 185.97 | 378.66 | 480.27 |
| Exit pupil position | −140.06 | −140.06 | −140.06 | −140.06 | −140.06 |
| Front principal point position | 90.95 | 155.95 | 229.75 | 381.14 | 382.12 |
| Rear principal point position | 14.45 | −7.46 | −36.30 | −137.55 | −210.54 |

Zoom lens unit data

| Unit | Start surface | Focal length | Lens configuration Length | Front principal point position | Rear principal point position |
|---|---|---|---|---|---|
| 1 | 1 | 82.84 | 69.14 | 43.41 | −1.23 |
| 2 | 14 | −169.57 | 14.11 | −45.01 | −77.29 |
| 3 | 19 | −29.15 | 1.20 | −0.03 | −0.71 |
| 4 | 21 | −104.03 | 5.24 | −1.34 | −4.25 |
| 5 | 24 | 51.79 | 10.82 | 1.72 | −5.10 |
| 6 | 29 | 95.20 | 104.74 | 45.22 | −53.94 |

-continued

| | | Unit: mm | | | |
|---|---|---|---|---|---|
| | | Extender unit | | | |
| Surface number | r | d | nd | vd | Effective diameter |
| 34 | −62.800 | 1.14 | | | 37.01 |
| 35ex | 33.568 | 6.31 | 1.59522 | 67.7 | 35.34 |
| 36ex | 218.849 | 9.68 | | | 34.25 |
| 37ex | 93.764 | 1.00 | 2.00100 | 29.1 | 27.73 |
| 38ex | 21.911 | 6.55 | 1.56732 | 42.8 | 26.05 |
| 39ex | −319.566 | 1.50 | | | 25.82 |
| 40ex | −207.173 | 0.88 | 1.88300 | 40.8 | 25.51 |
| 41ex | 18.608 | 7.70 | 1.72825 | 28.5 | 25.13 |
| 42ex | −110.740 | 1.50 | | | 25.34 |
| 43ex | −76.705 | 0.90 | 1.59522 | 67.7 | 25.34 |
| 44ex | 91.025 | 6.68 | | | 25.70 |

| Unit | Start surface | Focal length | Lens configuration Length | Front principal point position | Rear principal point position |
|---|---|---|---|---|---|
| ex | 35 | −204.81 | 36.02 | 126.51 | 59.74 |

| Various kinds of data when extender is inserted | | | | | |
|---|---|---|---|---|---|
| Focal length | 36.75 | 68.96 | 111.35 | 260.19 | 367.49 |
| F-number | 4.02 | 4.02 | 4.02 | 4.02 | 5.37 |
| Field angle | 30.49 | 17.42 | 11.00 | 4.75 | 3.37 |
| Image height | 21.64 | 21.64 | 21.64 | 21.64 | 21.64 |
| Total lens length | 309.10 | 309.10 | 309.10 | 309.10 | 309.10 |
| BF | 39.45 | 39.45 | 39.45 | 39.45 | 39.45 |

Numerical Example 6

| | | Unit: mm | | | |
|---|---|---|---|---|---|
| | | Surface data | | | |
| Surface number | r | d | nd | vd | Effective diameter |
| 1 | 259.203 | 3.20 | 1.77250 | 49.6 | 69.81 |
| 2 | 46.183 | 17.31 | | | 59.29 |
| 3 | −125.889 | 2.70 | 1.76385 | 48.5 | 58.00 |
| 4 | 122.608 | 0.20 | | | 57.86 |
| 5 | 92.639 | 4.65 | 1.92286 | 20.9 | 58.38 |
| 6 | 206.629 | 5.42 | | | 58.10 |
| 7 | −740.154 | 5.02 | 1.62041 | 60.3 | 58.08 |
| 8* | −157.499 | 8.68 | | | 58.15 |
| 9 | −23818.551 | 10.66 | 1.49700 | 81.5 | 59.41 |
| 10 | −58.538 | 2.50 | 1.78880 | 28.4 | 59.71 |
| 11 | −99.639 | 0.20 | | | 61.40 |
| 12 | 113.508 | 2.50 | 1.73800 | 32.3 | 61.48 |
| 13 | 60.437 | 16.88 | 1.49700 | 81.5 | 60.03 |
| 14 | −92.951 | 6.00 | | | 60.10 |
| 15 | 114.537 | 3.81 | 1.53775 | 74.7 | 55.67 |
| 16 | 239.811 | (variable) | | | 54.94 |
| 17 | 104.114 | 5.52 | 1.76385 | 48.5 | 45.76 |
| 18 | −553.864 | (variable) | | | 44.62 |
| 19* | 56.194 | 1.20 | 1.88300 | 40.8 | 30.33 |
| 20 | 21.027 | 6.89 | | | 26.49 |
| 21 | −52.667 | 3.16 | 1.84666 | 23.8 | 26.19 |
| 22 | −27.535 | 0.70 | 1.77250 | 49.6 | 26.13 |
| 23 | −53.152 | 2.02 | | | 25.90 |
| 24 | −28.450 | 0.70 | 1.72916 | 54.7 | 25.54 |
| 25 | −2270.665 | 0.16 | | | 25.97 |
| 26 | 69.298 | 4.00 | 1.65412 | 39.7 | 26.24 |
| 27 | −69.049 | (variable) | | | 26.18 |
| 28 | −38.178 | 0.90 | 1.65160 | 58.5 | 27.30 |
| 29 | −293.232 | 2.18 | 1.80810 | 22.8 | 28.59 |
| 30 | −129.854 | (variable) | | | 29.25 |
| 31 (stop) | ∞ | 1.30 | | | 33.76 |

-continued

| Unit: mm | | | | | |
|---|---|---|---|---|---|
| 32 | 197.392 | 4.57 | 1.88300 | 40.8 | 34.85 |
| 33 | −68.628 | 0.20 | | | 35.13 |
| 34 | −2479.117 | 2.45 | 1.60300 | 65.4 | 34.83 |
| 35 | −149.668 | 0.20 | | | 34.73 |
| 36 | 793.209 | 3.77 | 1.49700 | 81.5 | 34.37 |
| 37 | −72.013 | 1.20 | 2.00100 | 29.1 | 34.08 |
| 38 | −678.065 | 0.20 | | | 34.05 |
| 39 | 61.617 | 8.61 | 1.69895 | 30.1 | 33.84 |
| 40 | −46.250 | 1.10 | 2.00100 | 29.1 | 32.94 |
| 41 | 181.075 | 38.00 | | | 32.39 |
| 42 | 79.448 | 6.31 | 1.69350 | 50.8 | 33.89 |
| 43 | −73.361 | 5.00 | | | 33.83 |
| 44 | 39.471 | 7.91 | 1.43875 | 94.9 | 29.99 |
| 45 | −47.213 | 1.00 | 2.00069 | 25.5 | 28.59 |
| 46 | 43.158 | 3.79 | | | 27.68 |
| 47 | 89.391 | 5.23 | 1.80810 | 22.8 | 28.65 |
| 48 | −66.694 | 1.00 | 1.88300 | 40.8 | 28.77 |
| 49 | −382.681 | 0.20 | | | 28.92 |
| 50 | 21.802 | 2.37 | 1.43875 | 94.7 | 29.24 |
| 51 | 21.427 | 48.45 | | | 28.26 |
| Image plane ∞ | | | | | |

Aspherical surface data

Eighth surface

K = 1.29407e+000 A4 = 2.31557e−007 A 6 = −2.68991e−011 A 8 = −2.81353e−014
A10 = 7.51929e−017 A12 = −1.34264e−019 A14 = 8.67842e−023 A 16 = −1.59245e−026

19th surface

K = 1.88395e+000 A 4 = −2.59795e−007 A 6 = −1.00817e−010 A 8 = −3.87431e−011
A10 = 3.92036e−013 A12 = −2.61941e−015 A14 = 8.97129e−018 A16 = −1.21330e−020

Various kinds of data

| Zoom ratio | 3.50 | | | | |
|---|---|---|---|---|---|
| Focal length | 20.00 | 33.17 | 47.04 | 59.71 | 69.95 |
| F-number | 2.80 | 2.80 | 2.80 | 2.80 | 2.94 |
| Field angle | 36.50 | 24.05 | 17.47 | 13.92 | 11.95 |
| Image height | 14.80 | 14.80 | 14.80 | 14.80 | 14.80 |
| Total lens length | 322.99 | 322.99 | 322.99 | 322.99 | 322.99 |
| BF | 48.45 | 48.45 | 48.45 | 48.45 | 48.45 |
| d16 | 0.20 | 10.21 | 15.89 | 19.27 | 21.28 |
| d18 | 0.39 | 13.83 | 21.46 | 26.00 | 28.70 |
| d27 | 53.00 | 27.61 | 15.35 | 9.99 | 8.00 |
| d30 | 9.40 | 11.35 | 10.29 | 7.73 | 5.01 |
| d51 | 48.45 | 48.45 | 48.45 | 48.45 | 48.45 |
| Entrance pupil position | 47.37 | 61.45 | 72.40 | 80.17 | 85.26 |
| Exit pupil position | −85.41 | −85.41 | −85.41 | −85.41 | −85.41 |
| Front principal point position | 64.38 | 86.41 | 102.91 | 113.25 | 118.65 |
| Rear principal point position | 28.45 | 15.27 | 1.41 | −11.27 | −21.50 |

Zoom lens unit data

| Unit | Start surface | Focal length | Lens configuration Length | Front principal point position | Rear principal point position |
|---|---|---|---|---|---|
| 1 | 1 | 135.48 | 89.73 | 97.92 | 116.54 |
| 2 | 17 | 114.59 | 5.52 | 0.50 | −2.64 |
| 3 | 19 | −33.62 | 18.82 | 0.44 | −14.97 |
| 4 | 28 | −89.16 | 3.08 | −0.95 | −2.73 |
| 5 | 31 | 46.51 | 94.41 | 14.61 | −64.10 |

Extender unit

| Surface number | r | d | nd | vd | Effective diameter |
|---|---|---|---|---|---|
| 41 | 181.075 | 5.54 | | | 32.39 |
| 42ex | 29.510 | 6.40 | 1.49700 | 81.5 | 31.95 |
| 43ex | 472.580 | 1.47 | | | 31.09 |

-continued

| | | Unit: mm | | | |
|---|---|---|---|---|---|
| 44ex | 51.228 | 1.00 | 2.00100 | 29.1 | 28.97 |
| 45ex | 26.313 | 7.05 | 1.56732 | 42.8 | 27.29 |
| 46ex | −109.569 | 3.68 | | | 26.16 |
| 47ex | −67.323 | 0.88 | 1.88300 | 40.8 | 22.85 |
| 48ex | 18.195 | 5.21 | 1.71736 | 29.5 | 21.75 |
| 49ex | 136.029 | 2.86 | | | 21.90 |
| 50ex | 49.254 | 0.90 | 1.72916 | 54.7 | 22.85 |
| 51ex | 32.515 | 3.00 | | | 22.76 |

| Unit | Start surface | Focal length | Lens configuration Length | Front principal point position | Rear principal point position |
|---|---|---|---|---|---|
| ex | 42 | −660.43 | 29.46 | 355.93 | 216.43 |

| Various kinds of data when extender is inserted | | | | | |
|---|---|---|---|---|---|
| Focal length | 30.00 | 49.76 | 70.55 | 89.57 | 104.92 |
| F-number | 4.20 | 4.20 | 4.20 | 4.20 | 4.40 |
| Field angle | 35.80 | 23.50 | 17.05 | 13.58 | 11.65 |
| Image height | 21.64 | 21.64 | 21.64 | 21.64 | 21.64 |
| Total lens length | 323.00 | 323.00 | 323.00 | 323.00 | 323.00 |
| BF | 48.45 | 48.45 | 48.45 | 48.45 | 48.45 |

TABLE 1

Values in Inequalities in Numerical Examples 1 to 6

| | | Example 1 | Example 2 | Example 3 | Example 4 | Example 5 | Example 6 |
|---|---|---|---|---|---|---|---|
| Inequality (1) | (Def/Der)/βe + (1 − few/feF) | 1.36 | 1.25 | 1.70 | 1.55 | 1.20 | 1.71 |
| Inequality (2) | (le/Der)/βe | 1.04 | 0.90 | 0.89 | 0.82 | 0.95 | 0.86 |
| Inequality (3) | few/feF | 0.52 | 0.71 | 0.24 | 0.49 | 0.73 | 0.23 |
| Inequality (4) | few/f1 | 0.45 | 0.53 | 0.60 | 0.45 | 0.56 | 0.22 |
| Inequality (5) | βz | 0.58 | 0.51 | 0.43 | 0.58 | 0.56 | 0.41 |
| Inequality (6) | βe | 1.39 | 1.57 | 1.66 | 1.39 | 1.47 | 1.50 |
| Inequality (7) | (R12 + R11)/(R12 − R11) | 1.39 | 1.54 | 1.13 | 1.39 | 1.36 | 1.13 |
| Inequality (8) | hr/Der | 0.38 | 0.35 | 0.42 | 0.46 | 0.38 | 0.44 |
| Inequality (9) | fe1/Der | 3.59 | 2.41 | 2.34 | 2.92 | 2.55 | 2.76 |
| | few | 36.39 | 40.81 | 32.00 | 36.39 | 36.75 | 30.00 |
| | feF | 69.77 | 57.73 | 132.84 | 74.43 | 50.03 | 133.19 |
| | Def | 24.49 | 37.26 | 32.03 | 35.60 | 35.34 | 31.95 |
| | Der | 19.98 | 24.90 | 20.53 | 24.48 | 25.70 | 22.76 |
| | βe | 1.39 | 1.57 | 1.66 | 1.39 | 1.47 | 1.50 |
| | le | 28.97 | 35.14 | 30.28 | 28.04 | 36.02 | 29.46 |
| | f1 | 80.63 | 77.00 | 53.26 | 80.63 | 65.54 | 135.48 |
| | βz | 0.58 | 0.51 | 0.43 | 0.58 | 0.56 | 0.41 |
| | R11 | 30.45 | 29.02 | 24.50 | 30.32 | 33.57 | 29.51 |
| | R12 | 188.14 | 137.36 | 395.44 | 187.43 | 218.85 | 472.58 |
| | hr | 7.66 | 8.81 | 8.62 | 11.25 | 9.81 | 9.95 |
| | fe1 | 71.81 | 60.04 | 48.07 | 71.52 | 65.54 | 62.84 |

Heretofore, exemplary embodiments of the disclosure have been described, but the disclosure is not limited to these exemplary embodiments, and various modifications and changes can be made without departing from the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-199107, filed Oct. 31, 2019, which is hereby incorporated by reference herein in its entirety.

What is claimed is:

1. A zoom lens comprising in order from an object side to an image side:
   a first lens unit configured not to move for zooming;
   a plurality of zooming lens units configured to move in zooming;
   a front relay lens unit configured not to move for zooming;
   an extender lens unit insertable into and removable from an optical path for changing a focal length range of the zoom lens; and
   a rear relay lens unit configured not to move for zooming,
   wherein a part of the first lens unit moves at focusing, a combined focal length of the front relay lens unit, the extender lens unit and the rear relay lens unit is a positive value, wherein following conditional expressions are satisfied:

$$1.00 < (Def/Der)/\beta e + (1 - few/feF) < 1.75,$$

$$0.50 < (le/Der)/\beta e < 1.22, \text{ and}$$

$$0.10 < few/feF < 1.00,$$

where few is a focal length at a wide-angle end and in a state where the extender lens unit is inserted, feF is a combined focal length from the first lens unit to the front relay lens unit, Def is an effective diameter of a lens surface in a lens included in the extender lens unit and closest to the object side, Der is an effective diameter of a lens surface in a lens included in the extender lens unit and closest to the image side, βe is a lateral magnification of the extender lens unit, and le is a distance on an optical axis from a surface included in the extender lens unit and closest to the object side to a surface included in the extender lens unit and closest to the image side.

2. The zoom lens according to claim 1, wherein a following conditional expression is satisfied:

$$0.10 < few/f1 < 0.80,$$

where f1 is a focal length of the first lens unit.

3. The zoom lens according to claim 1, wherein a following conditional expression is satisfied:

$$0.30 < \beta z < 0.70,$$

where βz is a lateral magnification at the wide-angle end of a lens unit included in the plurality of zooming lens units, having a negative refractive power, and closest to the image side.

4. The zoom lens according to claim 1, wherein a following conditional expression is satisfied:

$$1.20 < \beta e < 1.80.$$

5. The zoom lens according to claim 1, wherein a following conditional expression is satisfied:

$$1.00 < (R12 + R11)/(R12 - R11) < 2.00,$$

where R11 is a curvature radius of a surface on the object side of a single lens included in the extender lens unit and closest to the object side, and R12 is a curvature radius of a surface on the image side of the single lens.

6. The zoom lens according to claim 1, wherein a following conditional expression is satisfied:

$$0.25 < hr/Der < 0.50,$$

where hr is a height of an on-axis light at a wide angle end on the surface included in the extender lens unit and closest to the image side.

7. The zoom lens according to claim 1, wherein a following conditional expression is satisfied:

$$1.00 < fe1/Der < 3.80,$$

where fe1 is a focal length of the lens included in the extender lens unit and closest to the object side.

8. An image pickup apparatus comprising:
a zoom lens; and
an image pickup element configured to pick up an image formed by the zoom lens,
wherein the zoom lens includes in order from an object side to an image side:
a first lens unit configured not to move for zooming,
a plurality of zooming lens units configured to move in zooming,
a front relay lens unit configured not to move for zooming,
an extender lens unit insertable into and removable from an optical path for changing a focal length range of the zoom lens, and
a rear relay lens unit configured not to move for zooming,
wherein a part of the first lens unit moves at focusing,
a combined focal length of the front relay lens unit, the extender lens unit and the rear relay lens unit is a positive value,
wherein following conditional expressions are satisfied:

$$1.00 < (Def/Der)/\beta e + (1 - few/feF) < 1.75,$$

$$0.50 < (le/Der)/\beta e < 1.22, \text{ and}$$

$$0.10 < few/feF < 1.00,$$

where few is a focal length at a wide-angle end and in a state where the extender lens unit is inserted, feF is a combined focal length from the first lens unit to the front relay lens unit, Def is an effective diameter of a lens surface in a lens included in the extender lens unit and closest to the object side, Der is an effective diameter of a lens surface in a lens included in the extender lens unit and closest to the image side, βe is a lateral magnification of the extender lens unit, and le is a distance on an optical axis from a surface included in the extender lens unit and closest to the object side to a surface included in the extender lens unit and closest to the image side.

9. The apparatus according to claim 8, wherein a following conditional expression is satisfied:

$$0.10 < few/f1 < 0.80,$$

where f1 is a focal length of the first lens unit.

10. The apparatus according to claim 8, wherein a following conditional expression is satisfied:

$$0.30 < \beta z < 0.70,$$

where βz is a lateral magnification at the wide-angle end of a lens unit included in the plurality of zooming lens units, having a negative refractive power, and closest to the image side.

11. The apparatus according to claim 8, wherein a following conditional expression is satisfied:

$$1.20 < \beta e < 1.80.$$

12. The apparatus according to claim 8, wherein a following conditional expression is satisfied:

$$1.00 < (R12 + R11)/(R12 - R11) < 2.00,$$

where R11 is a curvature radius of a surface on the object side of a single lens included in the extender lens unit and closest to the object side, and R12 is a curvature radius of a surface on the image side of the single lens.

13. The apparatus according to claim 8, wherein a following conditional expression is satisfied:

$$0.25 < hr/Der < 0.50,$$

where hr is a height of an on-axis light at a wide angle end on the surface included in the extender lens unit and closest to the image side.

14. The apparatus according to claim 8, wherein a following conditional expression is satisfied:

$1.00 < fe1/Der < 3.80$, where fe1 is a focal length of the lens included in the extender lens unit and closest to the object side.

* * * * *